US011273703B2

(12) United States Patent
Honda et al.

(10) Patent No.: US 11,273,703 B2
(45) Date of Patent: Mar. 15, 2022

(54) WORKING MACHINE

(71) Applicant: Kubota Corporation, Osaka (JP)

(72) Inventors: Keigo Honda, Sakai (JP); Hiroaki Nakagawa, Sakai (JP); Daisuke Sakurai, Sakai (JP); Hiroshi Fujiwara, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 169 days.

(21) Appl. No.: 16/882,545

(22) Filed: May 25, 2020

(65) Prior Publication Data

US 2020/0282824 A1    Sep. 10, 2020

Related U.S. Application Data

(60) Continuation of application No. 16/387,537, filed on Apr. 18, 2019, now Pat. No. 10,703,195, which is a
(Continued)

(30) Foreign Application Priority Data

Mar. 30, 2015  (JP) ................................. 2015-069937
Mar. 30, 2015  (JP) ................................. 2015-069938
Mar. 30, 2015  (JP) ................................. 2015-069939

(51) Int. Cl.
*B60K 13/04* (2006.01)
*E02F 9/08* (2006.01)
(Continued)

(52) U.S. Cl.
CPC ............ *B60K 13/04* (2013.01); *E02F 9/0883* (2013.01); *B60K 15/03006* (2013.01);
(Continued)

(58) Field of Classification Search
CPC .. B60K 13/04; B60K 15/03006; E02F 9/0883
See application file for complete search history.

(56) References Cited

U.S. PATENT DOCUMENTS

| 4,616,872 A | 10/1986 | Akira et al. |
| 6,616,398 B2 | 9/2003 | Dershem et al. |

(Continued)

FOREIGN PATENT DOCUMENTS

| EP | 2474672 | 7/2012 |
| JP | 61-097461 | 6/1986 |

(Continued)

OTHER PUBLICATIONS

Japanese Office Action for corresponding JP Application No. 2015-069939, dated Aug. 17, 2018 (w/ machine translation).
(Continued)

*Primary Examiner* — Kevin Hurley
(74) *Attorney, Agent, or Firm* — Mori & Ward, LLP

(57) ABSTRACT

A working machine includes a machine body having a front and a rear opposite to the front in a front-rear direction and an engine mounted in the machine body. A selective catalytic reduction catalyst is provided in the machine body and connected to the machine body and connected to the engine. A fuel tank is provided in the machine body to supply fuel to an engine. A urea aqueous solution tank is to store a urea aqueous solution. The urea aqueous solution tank is connected to the selective catalytic reduction catalyst and provided in the machine body between the engine and the front of the machine body in the front-rear direction. A traveling device support body supports the right traveling device and the left traveling device. The machine body does not rotate with respect to the traveling device support body.

46 Claims, 33 Drawing Sheets

Related U.S. Application Data division of application No. 15/084,489, filed on Mar. 30, 2016, now Pat. No. 10,308,108.

(51) Int. Cl.
  *B60K 15/03* (2006.01)
  *E02F 3/34* (2006.01)

(52) U.S. Cl.
  CPC ..... *B60Y 2200/41* (2013.01); *B60Y 2200/415* (2013.01); *E02F 3/3414* (2013.01); *F01N 2610/02* (2013.01); *F01N 2610/1406* (2013.01)

(56) References Cited

U.S. PATENT DOCUMENTS

| | | | |
|---|---|---|---|
| 8,038,379 | B2 | 10/2011 | Yamashita et al. |
| 8,342,789 | B2 | 1/2013 | Yasuda et al. |
| 8,545,163 | B2 | 10/2013 | Yasuda et al. |
| 9,267,268 | B2 | 2/2016 | Arai et al. |
| 9,290,906 | B2 | 3/2016 | Kobayashi et al. |
| 9,366,007 | B2 | 6/2016 | Azuma et al. |
| 9,556,770 | B2 | 1/2017 | Sandou |
| 9,783,042 | B2 | 10/2017 | Kurokawa |
| 10,060,094 | B2 | 8/2018 | Imano |
| 10,450,723 | B2 | 10/2019 | Osaka et al. |
| 2011/0005853 | A1 | 1/2011 | Kamiya |
| 2012/0067661 | A1 | 3/2012 | Kashu et al. |
| 2013/0276922 | A1 | 10/2013 | Kobayashi et al. |
| 2015/0233278 | A1 | 8/2015 | Shimazu et al. |
| 2015/0259877 | A1 | 9/2015 | Nishikawa et al. |
| 2016/0222631 | A1 | 8/2016 | Kohno et al. |
| 2017/0240387 | A1 | 8/2017 | Morimoto et al. |
| 2018/0044886 | A1 | 2/2018 | Namai |
| 2018/0245310 | A1 | 8/2018 | Kumagai et al. |
| 2019/0234281 | A1 | 8/2019 | Wiebenga et al. |
| 2021/0220764 | A1* | 7/2021 | Azuma .................. F01N 3/00 |

FOREIGN PATENT DOCUMENTS

| | | |
|---|---|---|
| JP | 2003-020936 | 1/2003 |
| JP | 2009-068395 | 4/2009 |
| JP | 2009-250168 | 10/2009 |
| JP | 2010-012826 | 1/2010 |
| JP | 2010-059681 | 3/2010 |
| JP | 2011-012661 | 1/2011 |
| JP | 2011-063988 | 3/2011 |
| JP | WO2011/027765 | 3/2011 |
| JP | 2011-247232 | 12/2011 |
| JP | 2012-062691 | 3/2012 |
| JP | 2013-036228 | 2/2013 |
| JP | 2014-121921 | 7/2014 |
| JP | 2014-159764 | 9/2014 |
| JP | 2014-190330 | 10/2014 |
| JP | 2014-224364 | 12/2014 |
| JP | 2014-227779 | 12/2014 |
| JP | 2016-223198 | 12/2016 |
| JP | 2019-056296 | 4/2019 |

OTHER PUBLICATIONS

Office Action with Form PTO-892 Notice of References Cited issued by the U.S. Patent and Trademark Office for U.S. Appl. No. 15/084,489, dated Sep. 21, 2018.

Notice of Allowance issued by the United States Patent and Trademark Office for U.S. Appl. No. 15/084,489, dated Jan. 29, 2019.

Japanese Office Action for corresponding JP Application No. 2018-218267, dated Jan. 27, 2020 (w/ machine translation).

Office Action with Form PTO-892 Notice of References Cited issued by the U.S. Patent and Trademark Office for parent U.S. Appl. No. 16/387,537, dated Nov. 22, 2019.

Notice of Allowance issued by the United States Patent and Trademark Office for parent U.S. Appl. No. 16/387,537, dated Feb. 26, 2020.

Japanese Office Action for corresponding JP Application No. 2020-217502, dated Sep. 15, 2021 (w/ machine translation).

Japanese Office Action for corresponding JP Application No. 2018-218267, dated Sep. 17, 2020 (w/ machine translation).

* cited by examiner

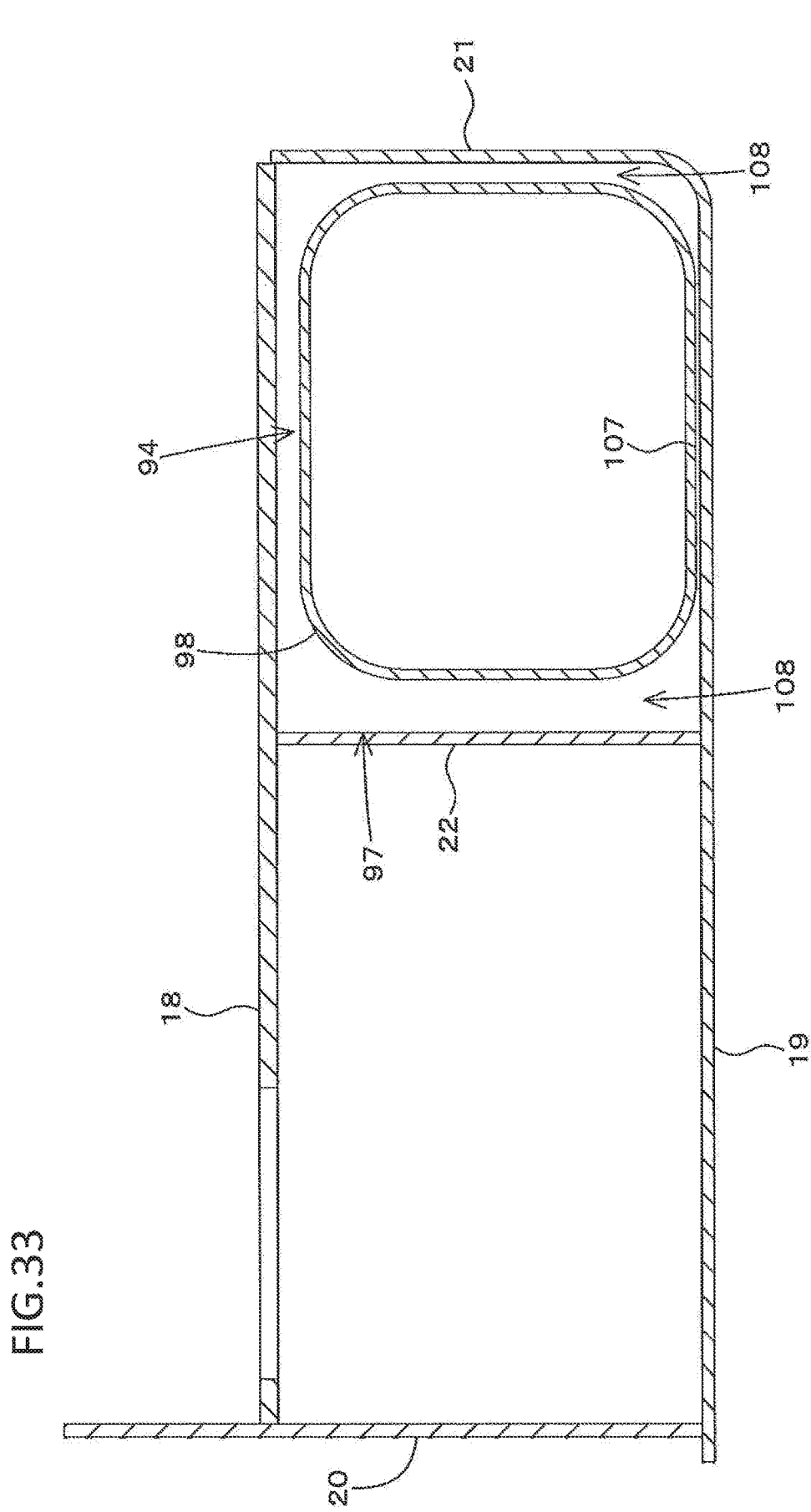

WORKING MACHINE

CROSS-REFERENCE TO RELATED APPLICATIONS

The present application is a continuation application of U.S. patent application Ser. No. 16/387,537, filed Apr. 18, 2019, which is a divisional application of the U.S. patent application Ser. No. 15/084,489, filed Mar. 30, 2016, which was issued as U.S. Pat. No. 10,308,108, which claims priority under 35 U.S.C. § 119 to Japanese Patent Application No. 2015-069937, filed Mar. 30, 2015, entitled "Working Machine", Japanese Patent Application No. 2015-069938, filed Mar. 30, 2015, entitled "Working Machine", and Japanese Patent Application No. 2015-069939, filed Mar. 30, 2015, entitled "Working Machine". The contents of these applications are incorporated herein by reference in their entirety.

BACKGROUND OF THE INVENTION

Field of the Invention

The present invention relates to a working machine.

Discussion of the Background

JP 2010-59681 A discloses a working machine which includes a machine body, a boom provided on the side of the machine body, and a lift link pivotally supported on a rear part of the boom.

SUMMARY OF THE INVENTION

According to one aspect of the present invention, a working machine includes a machine body, a right traveling device, a left traveling device, a boom, an engine, a selective catalytic reduction catalyst, a fuel tank, a urea aqueous solution tank, and a traveling device support body. The machine body has a front and a rear opposite to the front in a front-rear direction of the working machine and having a right side and a left side opposite to the right side in a right-left direction perpendicular to the front-rear direction. The right traveling device is arranged on the right side of the machine body. The left traveling device arranged on the left side of the machine body. The boom has a boom front and a boom rear opposite to the boom front in the front-rear direction. The boom rear is rotatably supported at the rear of the machine body. The boom front is to be connected to a working tool. The engine is mounted in the machine body. The selective catalytic reduction catalyst is provided in the machine body and connected to the engine. The fuel tank is provided in the machine body to supply fuel to the engine. The urea aqueous solution tank is to store a urea aqueous solution. The urea aqueous solution tank is connected to the selective catalytic reduction catalyst and provided in the machine body between the engine and the front of the machine body in the front-rear direction. The traveling device support body supports the right traveling device and the left traveling device. The machine body does not rotate with respect to the traveling device support body.

According to another aspect of the present invention, a working machine includes a machine body, a right traveling device, a left traveling device, a boom, an additional boom, an engine, a selective catalytic reduction catalyst, a fuel tank, and a urea aqueous solution tank. The machine body has a front and a rear opposite to the front in a front-rear direction of the working machine and having a right side and a left side opposite to the right side in a right-left direction perpendicular to the front-rear direction. The right traveling device is arranged on the right side of the machine body. The left traveling device arranged on the left side of the machine body. The boom has a boom front and a boom rear opposite to the boom front in the front-rear direction. The boom rear is rotatably supported at the rear of the machine body. The boom front is to be connected to a working tool. The boom is provided at one of the right side and the left side of the machine body. The additional boom has an additional boom front and an additional boom rear opposite to the additional boom front in the front-rear direction. The additional boom rear is rotatably supported at the rear of the machine body. The additional boom front is to be connected to the working tool. The additional boom is provided at another of the right side and the left side of the machine body. The engine is mounted in the machine body. The selective catalytic reduction catalyst is provided in the machine body and connected to the engine. The fuel tank is provided in the machine body to supply fuel to the engine. The urea aqueous solution tank is to store a urea aqueous solution. The urea aqueous solution tank is connected to the selective catalytic reduction catalyst and provided in the machine body between the engine and the front of the machine body in the front-rear direction and between the boom and the additional boom in the right-left direction.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein

FIG. 33 is a sectional plan view of an installment portion according to the further variation of the first to sixth embodiments.

DESCRIPTION OF THE EMBODIMENTS

Figure 1:
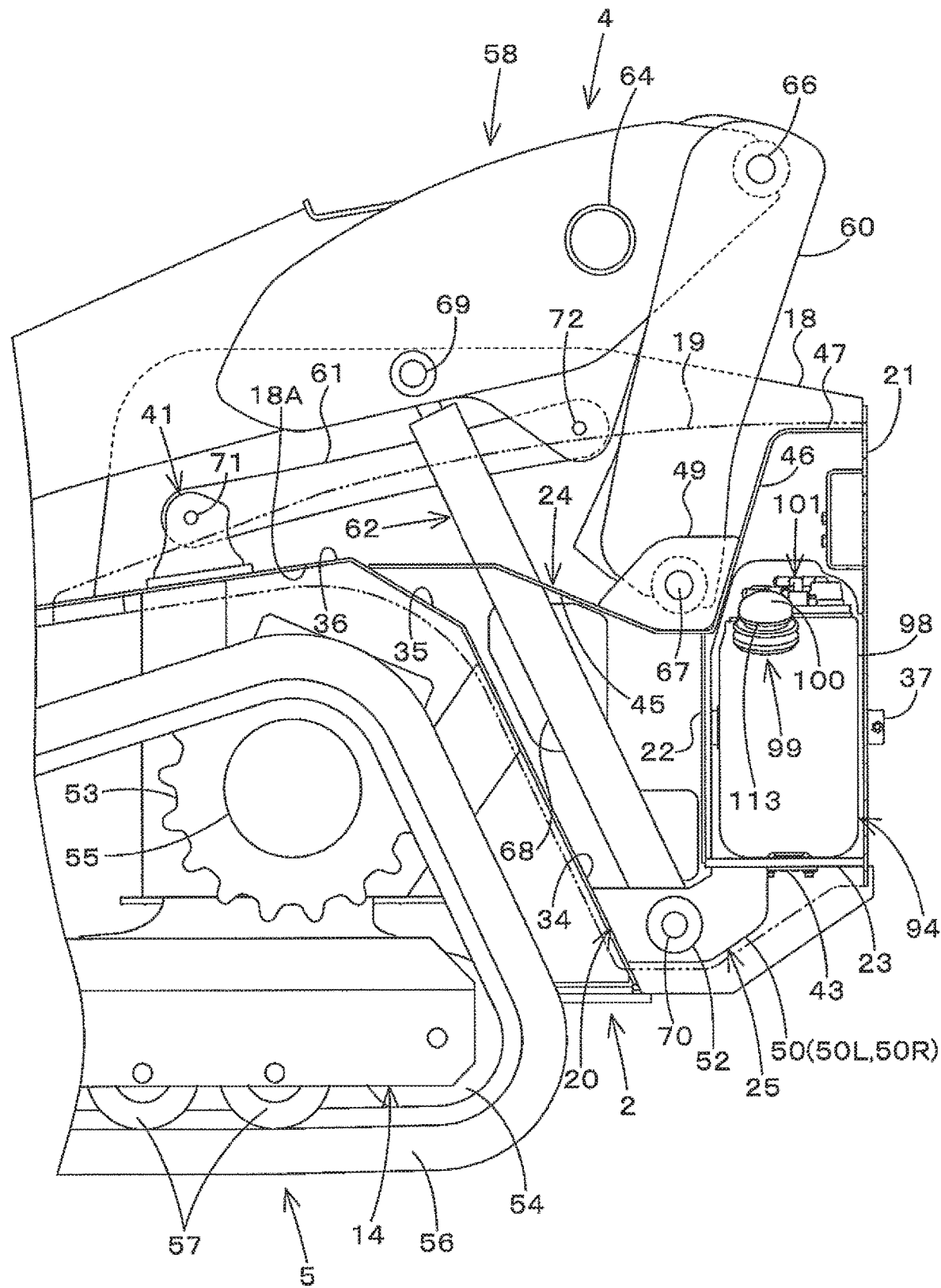
FIG. 1 is a side view of a rear part of a machine body according to a first embodiment.

The embodiments will now be described with reference to the accompanying drawings, wherein like reference numerals designate corresponding or identical elements throughout the various drawings.

First Embodiment

Hereinafter, a first embodiment of a working machine according to the first embodiment of the present invention will be described with reference to the drawings.

Figure 11:
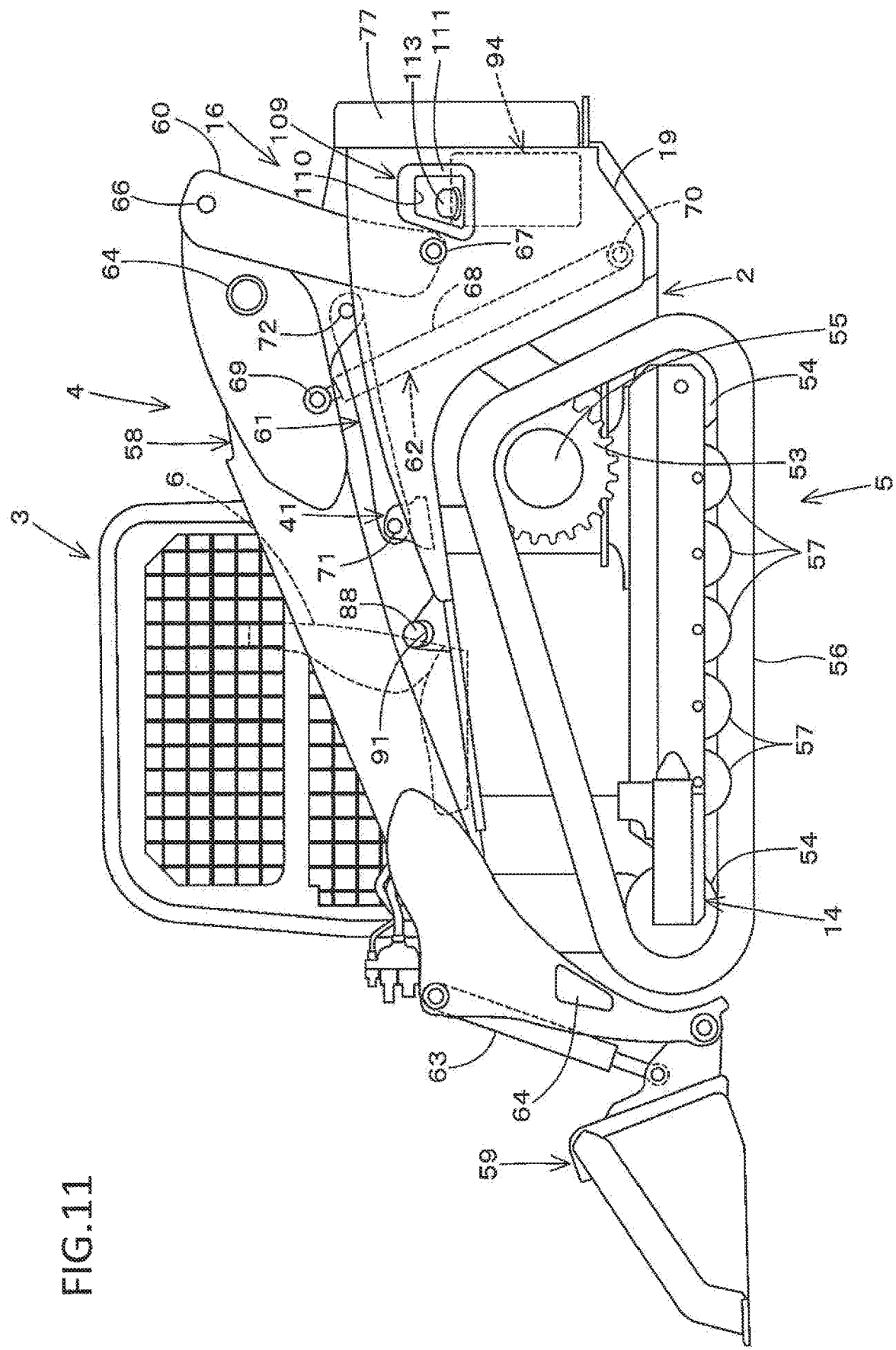
FIG. 11 is a side view of a working machine according to the first embodiment.
Figure 12:
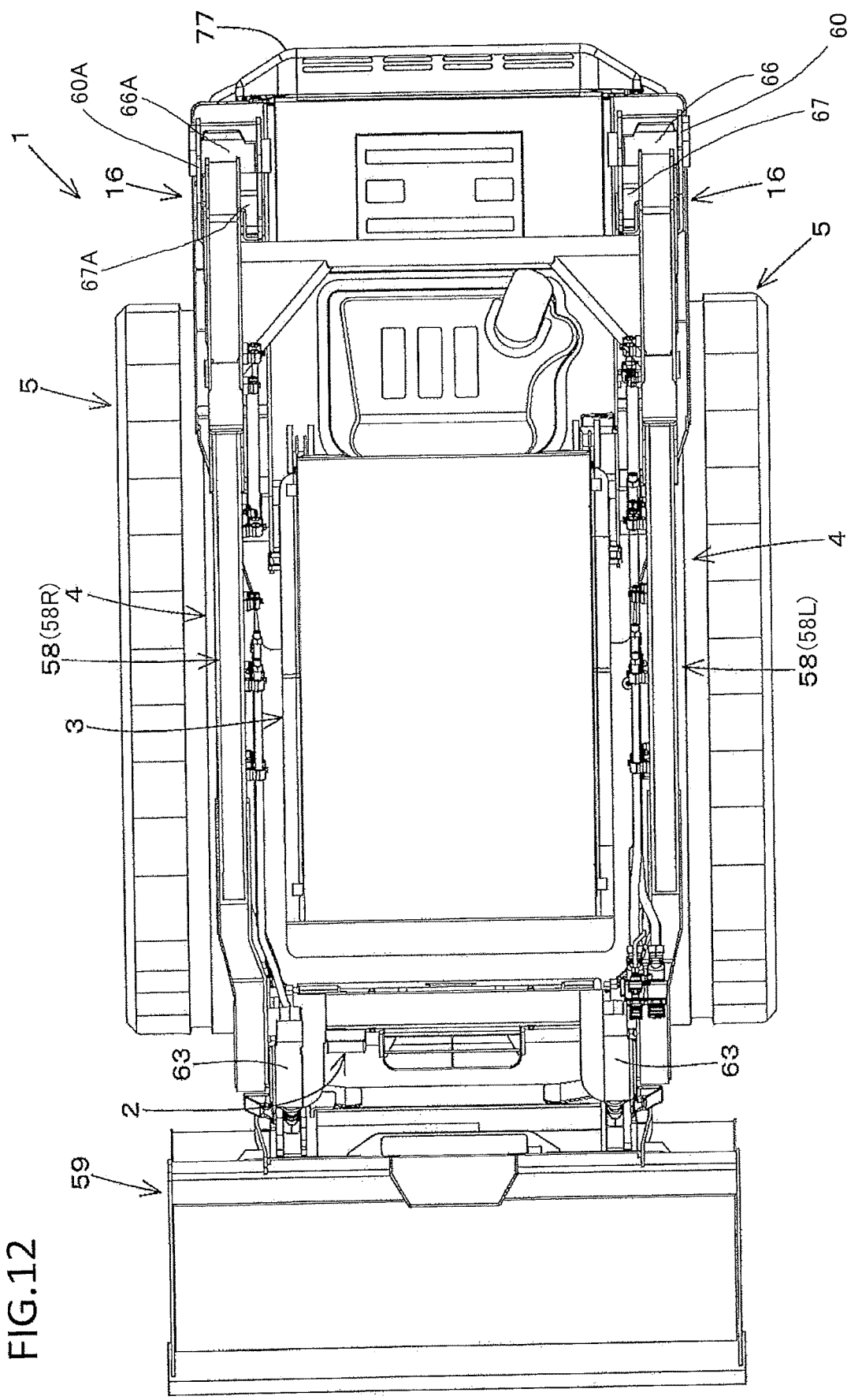
FIG. 12 is a plan view of the working machine according to the first embodiment.
Figure 13:
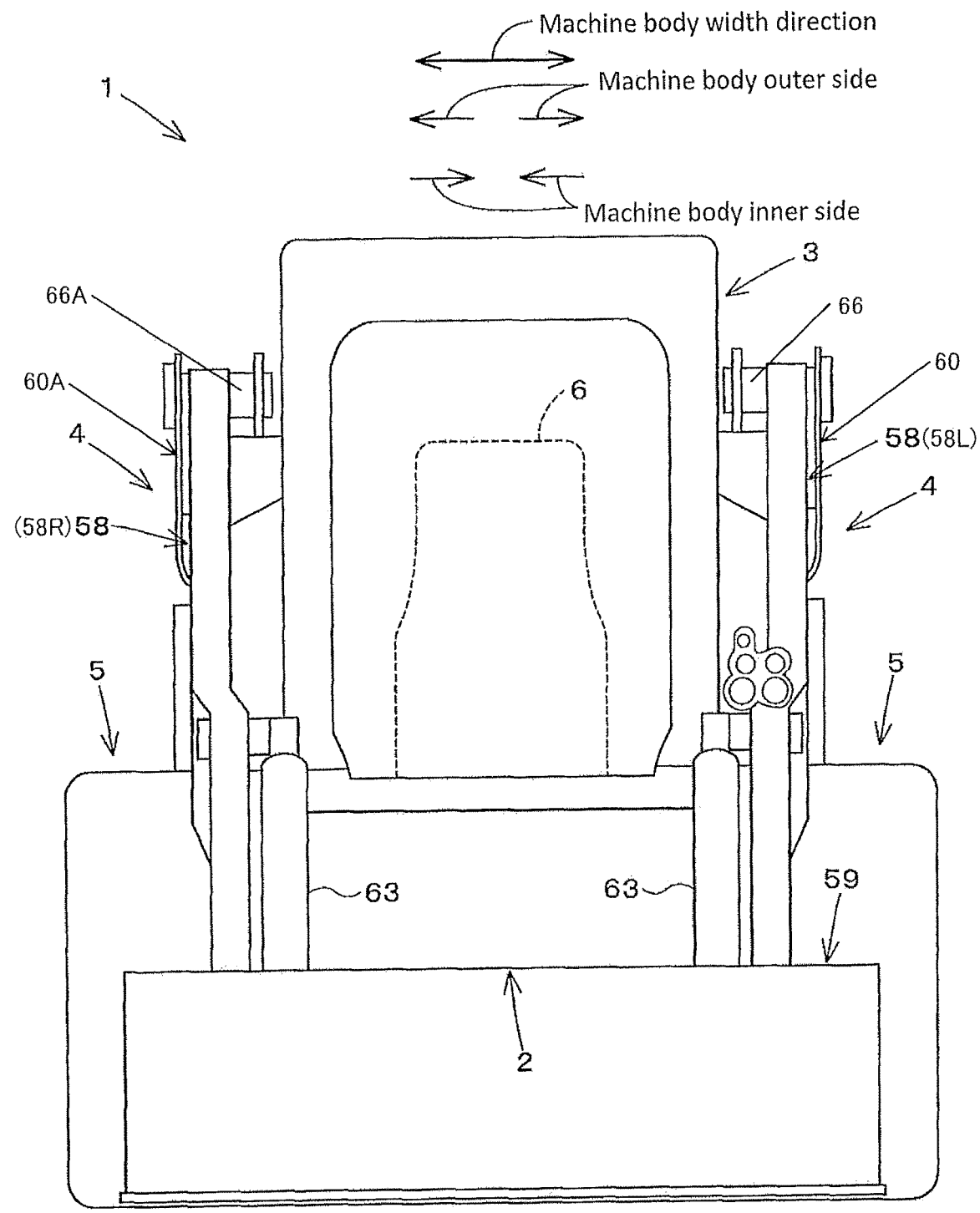
FIG. 13 is a front view of the working machine according to the first embodiment.

FIG. 11 shows a side view of a working machine 1 according to the first embodiment of the present invention. FIG. 12 shows a plan view of the working machine 1. FIG. 13 shows a front view of the working machine 1.

In FIGS. 11 to 13, a compact track loader is shown as one example of the working machine 1. However, the working machine 1 according to the first embodiment of the present invention is not limited to the compact track loader but may be other types of working machines such as a skid-steer loader.

The working machine 1 includes a machine body (vehicle body) 2, a cabin 3, working devices 4, and traveling devices 5. The cabin 3 is mounted in the machine body 2 on the front part side. In this cabin 3, a driver's seat 6 is provided.

It should be noted that in the first embodiment of the present invention, the front side of a driver seated in the driver's seat 6 of the working machine 1 (left side of FIG. 11) will be referred to as the front side, the rear side of the driver (right side of FIG. 11) will be referred to as the rear side, the left side of the driver (near side of FIG. 11) will be referred to as the left side, and the right side of the driver (far side of FIG. 11) will be referred to as the right side in the following description.

The horizontal direction orthogonal to the front and rear direction (front-rear direction) will be referred to as the machine body width direction (right-left direction) in the following description. As shown in FIG. 13, the side away from a center part of the machine body 2 and close to a right part or a left part will be referred to as the machine body outer side in the following description. In other words, the machine body outer side indicates the side away from the machine body 2 in the machine body width direction. The opposite side to the machine body outer side will be referred to as the machine body inner side in the following description. In other words, the machine body inner side indicates the side close to the machine body 2 in the machine body width direction.

Figure 5:
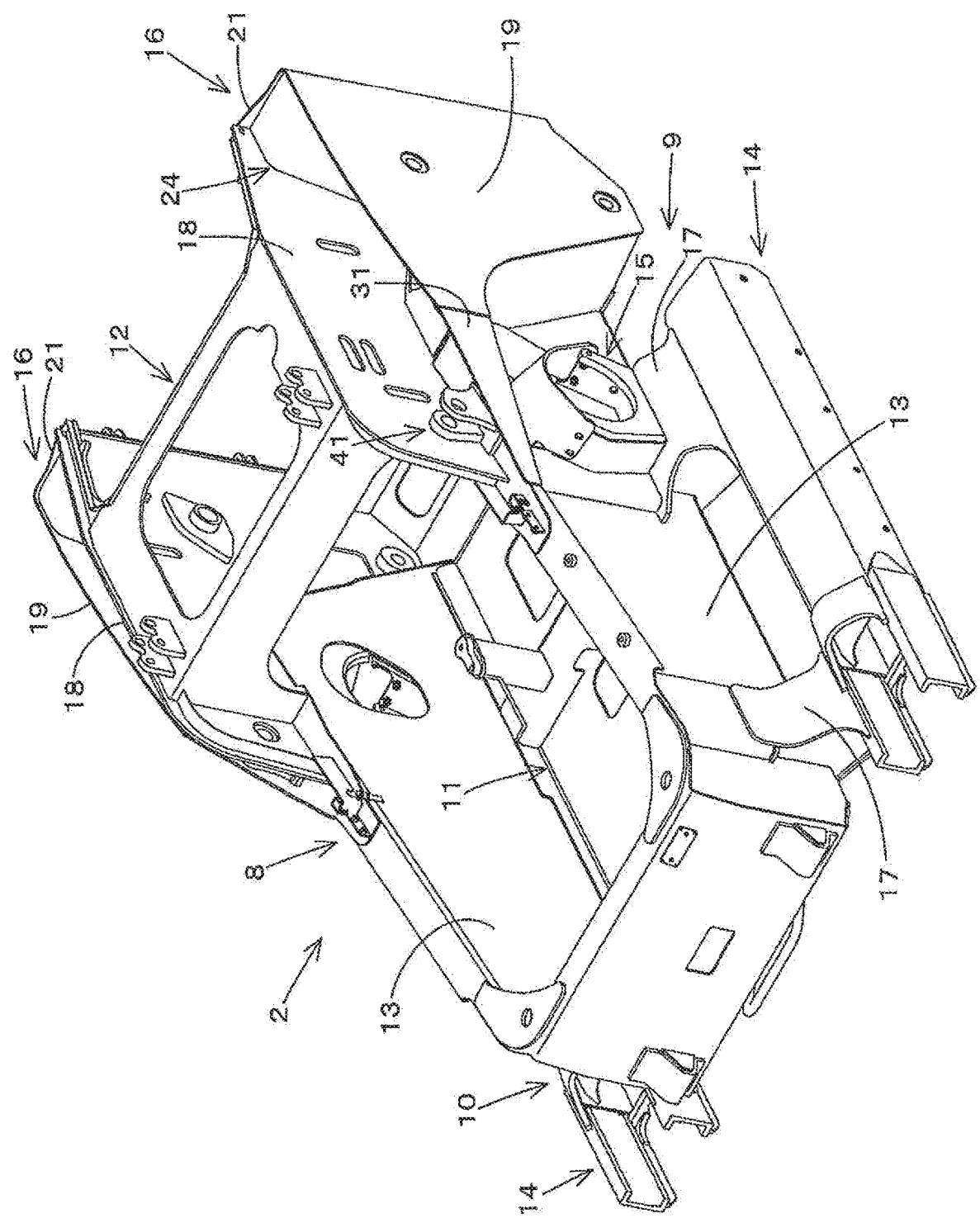
FIG. 5 is a perspective view of the machine body according to the first embodiment.

As shown in FIG. 5, the machine body 2 has a right side frame portion 8, a left side frame portion 9, a front frame portion 10, a bottom frame portion 11, and an upper frame portion 12. The right side frame portion 8, the left side frame portion 9, the front frame portion 10, the bottom frame portion 11, and the upper frame portion 12 are formed by combining plate materials.

The right side frame portion 8 forms the right part of the machine body 2. The left side frame portion 9 forms the left part of the machine body 2. The front frame portion 10 forms a front part of the machine body 2, and couples front parts of the right side frame portion 8 and the left side frame portion 9. The bottom frame portion 11 forms a bottom part of the machine body 2, and couples lower parts of the right side frame portion 8 and the left side frame portion 9. The upper frame portion 12 forms a rear upper part of the machine body 2, and couples rear upper parts of the right side frame portion 8 and the left side frame portion 9.

Hereinafter, the right side frame portion 8 and the left side frame portion 9 will be described. However, since the right side frame portion 8 and the left side frame portion 9 have the substantially same configurations, the side frame portions 8, 9 will be described with reference to the left side frame portion 9 in the first embodiment.

As shown in FIG. 5, each of the side frame portions 8, 9 has a main frame 13, a track frame (a traveling device support body) 14, a motor attachment portion 15, and a support frame 16.

Figure 7:
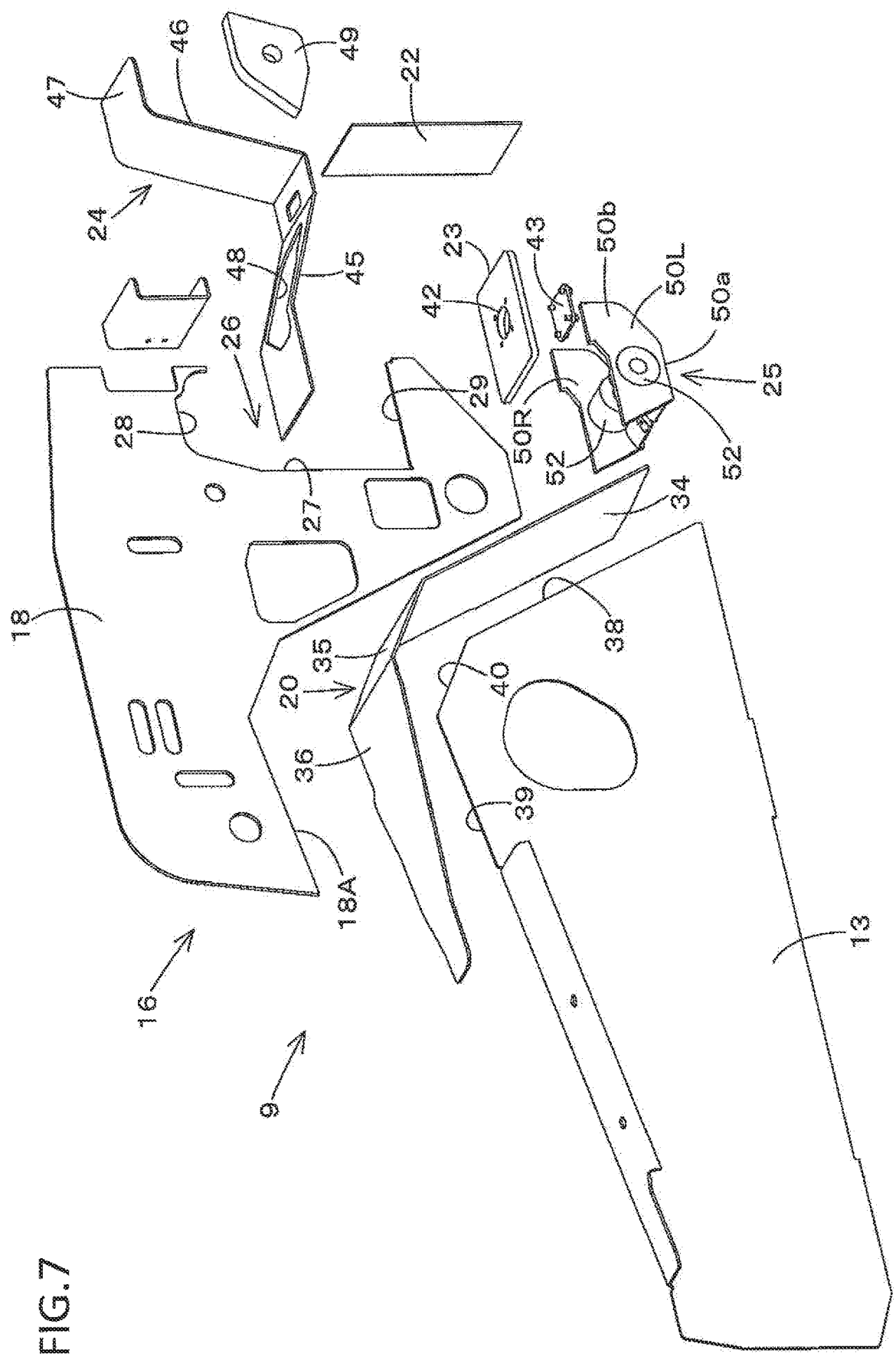
FIG. 7 is an exploded perspective view of the support frame in which part of the support frame is omitted according to the first embodiment.

As shown in FIG. 7, the main frame 13 is arranged in such a manner that plate surfaces are directed in the machine body width direction, and provided ranging from the front part of the machine body 2 to a rear part.

As shown in FIG. 5, the track frame 14 is attached to a lower part of an outer side surface of the main frame 13 via attachment members 17. The motor attachment portion 15 is provided in a rear upper part of the outer side surface of the main frame 13.

The support frame 16 is attached to a rear part of the main frame 13.

Figure 6:
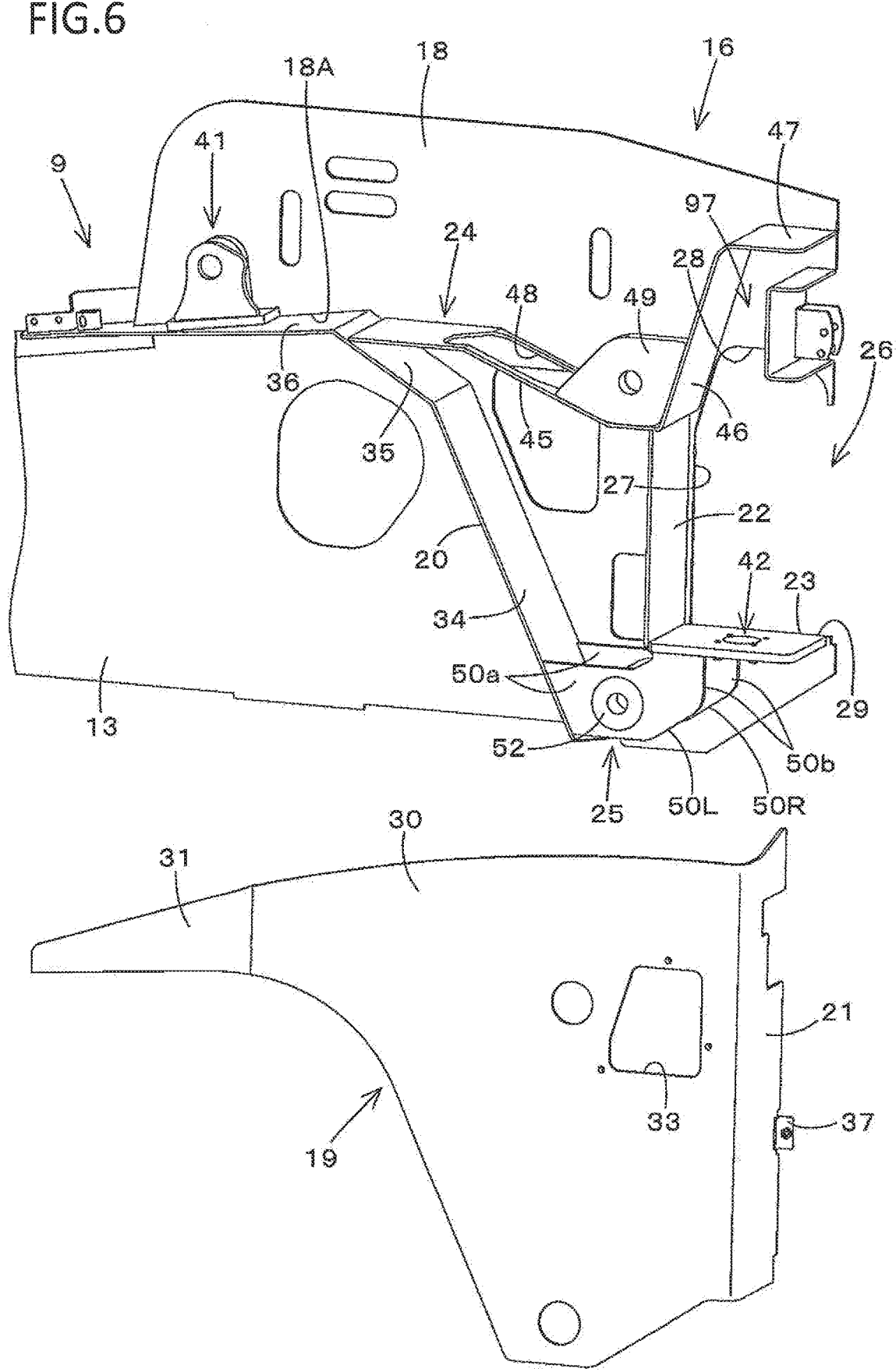
FIG. 6 is a perspective view of a support frame in a state where an outer wall is detached according to the first embodiment.

As shown in FIGS. 6 and 7, the support frame 16 has an inner wall (first wall) 18, an outer wall (second wall) 19, a front wall (fourth wall) 20, a rear wall (third wall) 21, a partition wall (fifth wall) 22, a bottom plate 23, a reinforcing wall 24, and a cylinder attachment portion 25.

The inner wall 18 and the outer wall 19 are provided so as to face each other and spaced from each other in the machine body width direction. The outer wall 19 is positioned on the machine body outer side of the inner wall 18.

Figure 8:
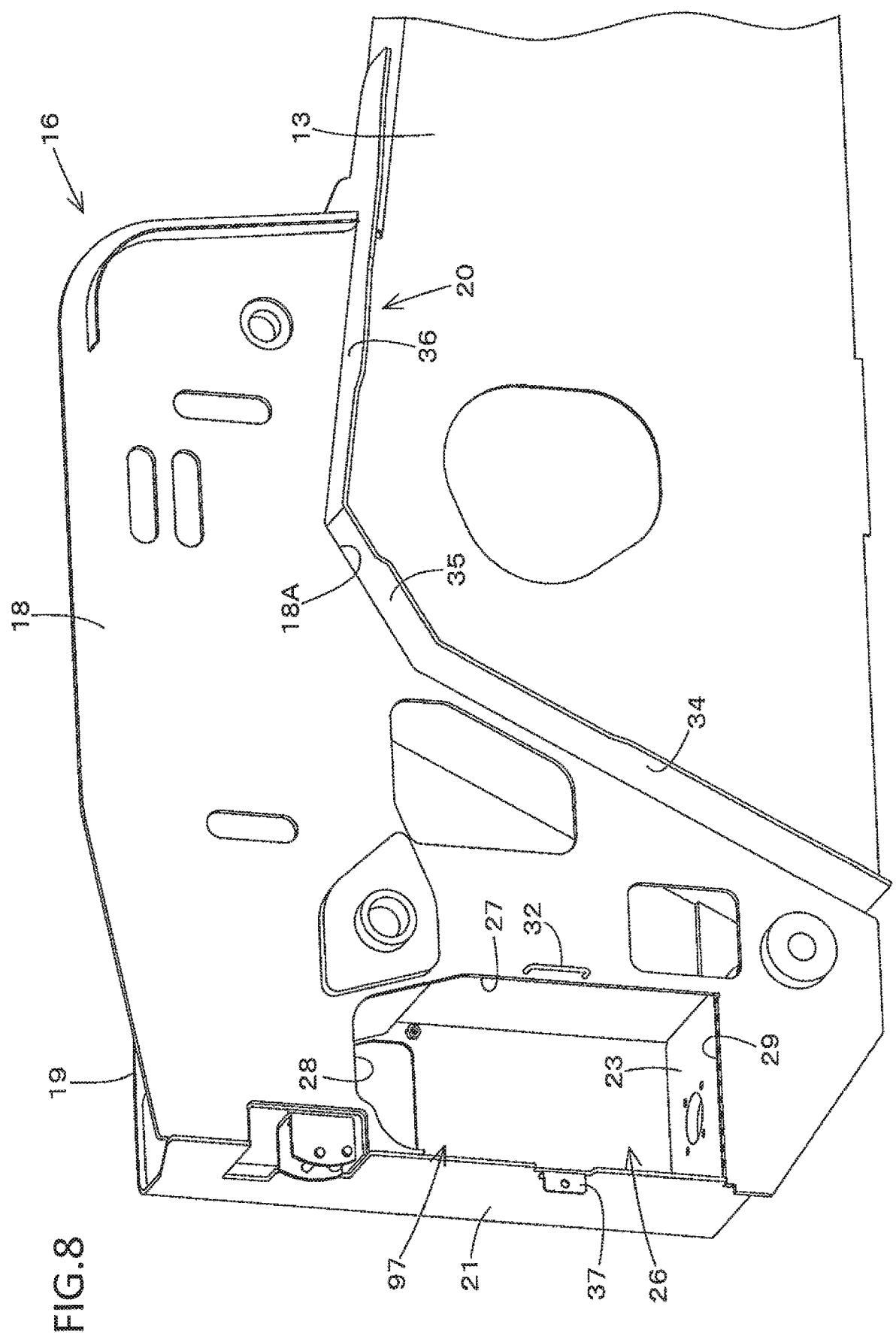
FIG. 8 is a perspective view of a rear part of the support frame on the inner surface side according to the first embodiment.

The inner wall 18 is formed by for example one plate material. In a rear part of this inner wall 18, a cut-away portion 26 is formed into a penetrating shape in the machine body width direction. This cut-away portion 26 has a front edge portion 27, an upper edge portion 28, and a lower edge portion 29, and is formed into an open shape toward the rear side. As shown in FIG. 8, a locking member 32 is provided on a surface of the inner wall 18 on the machine body inner side. This locking member 32 is formed by a rod material, and provided in the vicinity of the front edge portion 27 of the cut-away portion 26 and in an up-down intermediate part of the front edge portion 27.

As shown in FIG. 6, the outer wall 19 has a main part 30 and a sub part 31 formed by plate materials. The sub part 31 is fixed to a front end of the main part 30 in a forward projecting form. In an up-down intermediate part of a rear part of the main part 30, a placement hole 33 formed by an annular edge portion is formed. It should be noted that the main part 30 and the sub part 31 may be formed by for example one plate material and integrated with each other.

As shown in FIGS. 1, 6, and 7, the front wall 20 has a first part 34, a second part 35, and a third part 36. The first part 34 is secured to a rear end 38 of the main frame 13. This first part 34 is formed into a front-upward inclined shape along the rear end 38 of the main frame 13. The second part 35 is extended from an upper end of the first part 34 toward the front obliquely upper side. This second part 35 is secured to a corner portion 40 between the rear end 38 and an upper end 39 of the main frame 13. The third part 36 is extended from a front end of the second part 35 in a front-downward inclined shape. This third part 36 is secured to a rear part of the upper end 39 of the main frame 13. A link attachment portion 41 is fixed to an upper surface of the third part 36.

As shown in FIGS. 6 and 8, since the front wall 20 is provided in an intermediate part of the main frame 13 in the machine body width direction, the front wall projects not only toward the machine body inner side of the main frame 13 but also toward the machine body outer side. A part of the front wall 20 projecting from the main frame 13 toward the machine body outer side serves as a fender covering a rear part of the traveling device 5. An edge portion 18A formed in a front part of the inner wall 18 is formed into a shape along a back surface of the first part 34 and upper surfaces of the second part 35 and the third part 36 of the front wall 20. The first part 34, the second part 35, and the third part 36 are secured to the edge portion 18A of the inner wall 18. The outer wall 19 is secured to machine body outer side end parts of the first part 34, the second part 35, and the third part 36. Therefore, the front wall 20 couples the front part of the inner wall 18 and a front part of the outer wall 19. It should be noted that it is sufficient if parts of the first part 34, the second part 35, and the third part 36 are secured to the outer wall 19.

As shown in FIGS. 6 and 8, the rear wall 21 is extended from a rear end of the outer wall 19 (rear end of the main part 30) toward the machine body inner side. A machine body inner side end part of this rear wall 21 is fixed to a rear end part of the inner wall 18. Therefore, the rear wall 21 couples the rear part of the inner wall 18 and a rear part of the outer wall 19. A stay 37 is provided in the rear wall 21. This stay 37 is provided on the machine body inner side of a back surface of the rear wall 21 at a position corresponding to the rear side of the locking member 32.

It should be noted that the rear wall 21 and the outer wall 19 are integrated with each other by one plate material in the first embodiment.

As shown in FIGS. 1 and 6, the partition wall 22 is provided between the front wall 20 and the rear wall 21 and between the inner wall 18 and the outer wall 19. The partition wall 22 is positioned in the vicinity of the front edge portion 27 of the cut-away portion 26 and couples the inner wall 18 and the outer wall 19.

Figure 2:
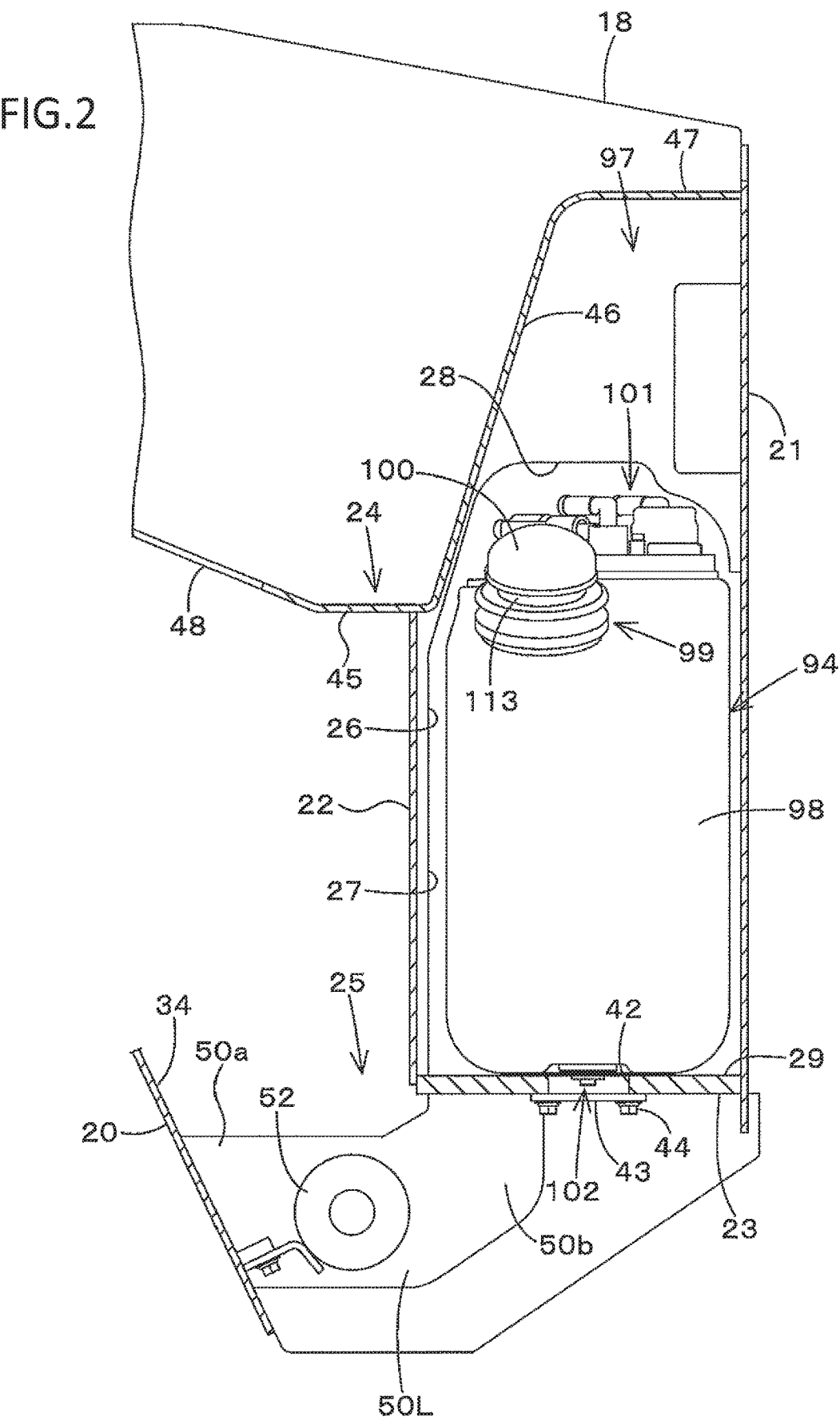
FIG. 2 is a sectional side view of an installment portion of a urea aqueous solution tank according to the first embodiment.
Figure 3:
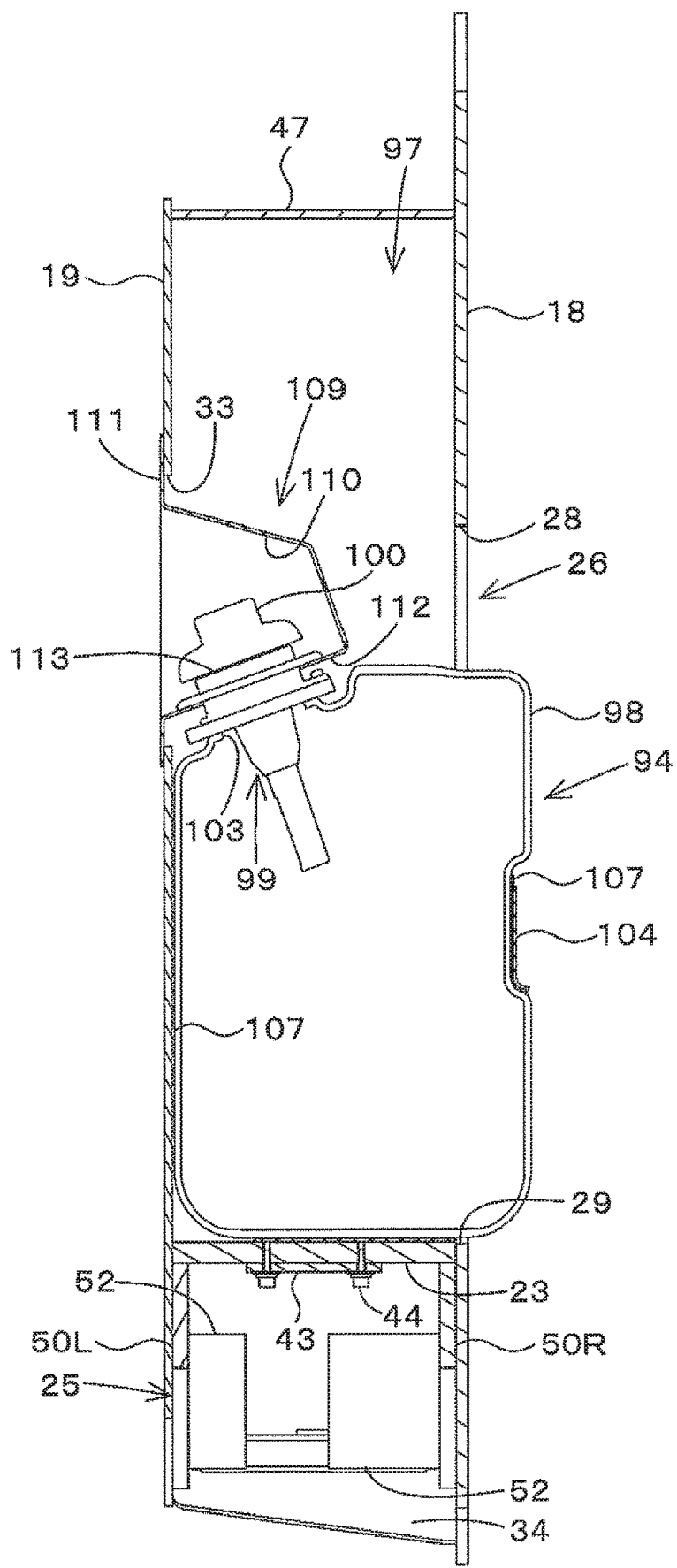
FIG. 3 is a sectional back view of the installment portion of the urea aqueous solution tank according to the first embodiment.
Figure 4:
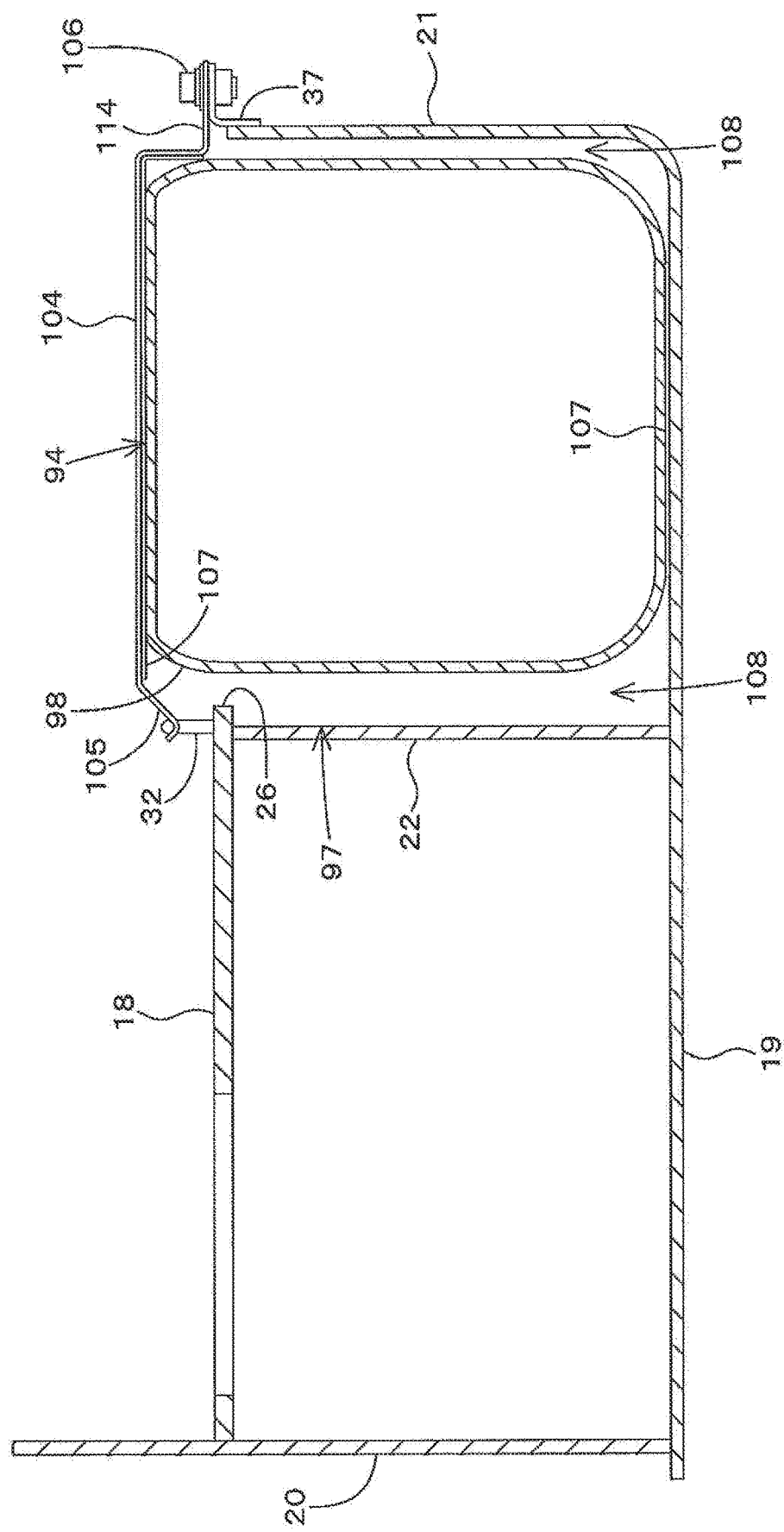
FIG. 4 is a sectional plan view of the installment portion of the urea aqueous solution tank according to the first embodiment.

As shown in FIGS. 2, 3, and 4, the bottom plate 23 is provided between the inner wall 18 and the outer wall 19 along the lower edge portion 29 of the cut-away portion 26. This bottom plate 23 couples a lower end of the partition wall 22 and a lower end of the rear wall 21. The bottom plate 23 couples the inner wall 18 and the outer wall 19. The bottom plate 23 has an opening portion 42 formed by an annular edge portion, and a lid plate 43 closing this opening portion 42. The opening portion 42 is formed in a front-rear intermediate part of the bottom plate 23 and in an intermediate part in the machine body width direction. The lid plate 43 is detachably attached to a lower surface of the bottom plate 23 by bolts 44. A part on the lower side of the bottom plate 23 is not closed but formed into an open shape.

As shown in FIGS. 1 and 6, the reinforcing wall 24 is provided between the inner wall 18 and the outer wall 19 ranging from an upper part of the second part 35 of the front wall 20 to an upper part of the rear wall 21, and couples the inner wall 18 and the outer wall 19. This reinforcing wall 24 has a front part 45, an intermediate part 46, and a rear part 47. The front part 45 is provided ranging from the upper part of the second part 35 of the front wall 20 to an upper end of the partition wall 22. The intermediate part 46 is extended from a rear end of the front part 45 toward the rear obliquely upper side. The rear part 47 is extended from an upper end of the intermediate part 46 toward the rear side, and connected to a front surface of the rear wall 21. A through hole 48 formed by an annular edge portion is formed in the front part 45. A support plate 49 is provided in a corner part between the front part 45 and the intermediate part 46 in a machine body outer side end part.

As shown in FIGS. 1, 3, 6, and 7, the cylinder attachment portion 25 is provided between lower parts of the inner wall 18 and the outer wall 19. This cylinder attachment portion 25 has a right plate member 50R and a left plate member 50L. The right plate member 50R and the left plate member 50L face each other in the machine body width direction. Front ends of the plate members 50R, 50L are secured to a back surface lower part of the first part 34 of the front wall 20. Front portions 50a of the plate members 50R, 50L extend rearward from the back surface lower end side of the first part 34. Cylinder support portions 52 are provided in the front portions 50a of the plate members 50R, 50L. Rear portions 50b of the plate members 50R, 50L are bent toward the upper side, and upper ends are secured to a front part lower surface of the bottom plate 23.

As shown in FIG. 11, crawler type traveling devices 5 are adopted as the traveling devices 5 in the first embodiment. The traveling devices 5 are provided on the left side and the right side of the machine body 2.

Figure 14:
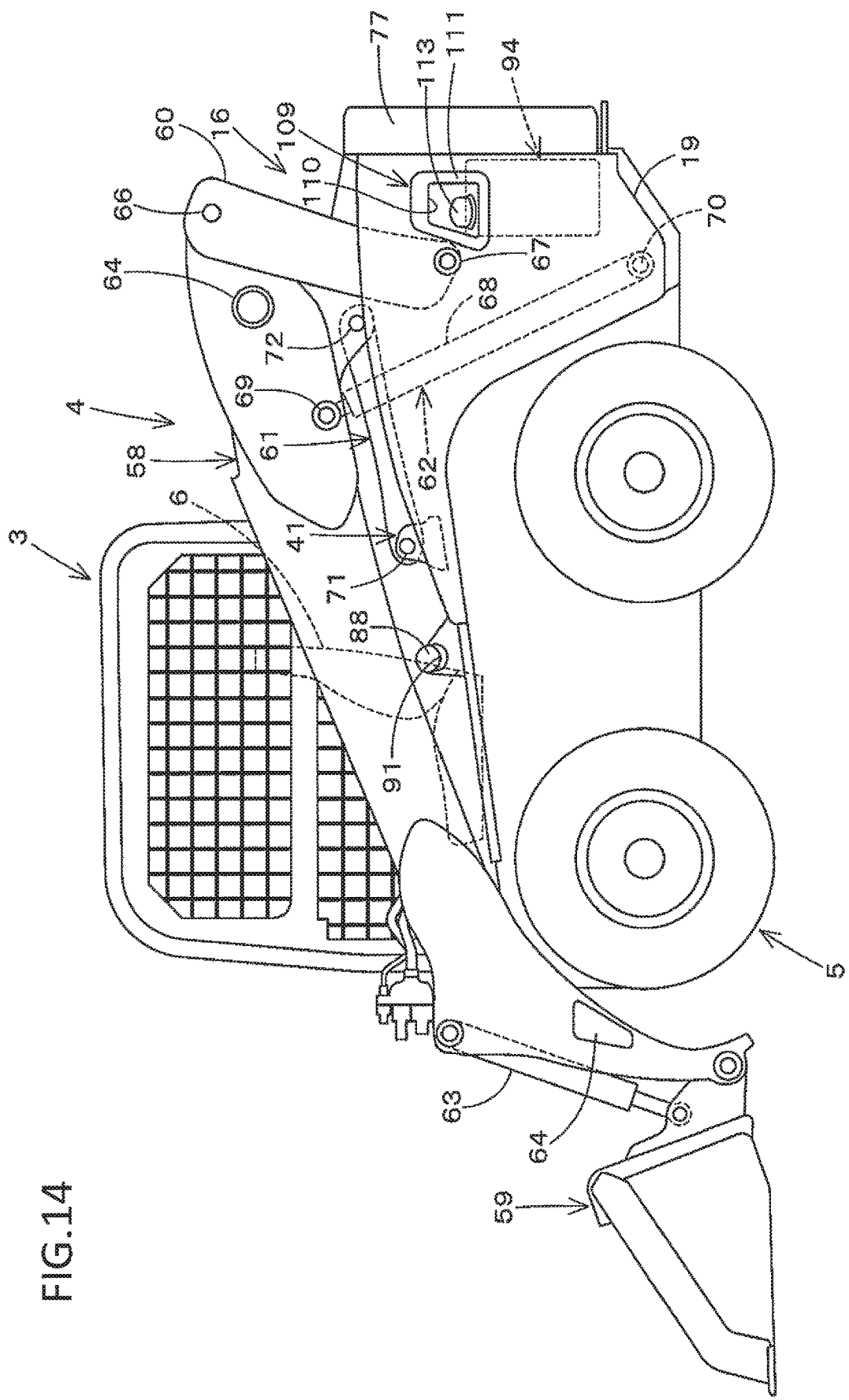
FIG. 14 is a side view of the working machine including wheel type traveling devices according to one variation of the first embodiment.

Each of the traveling devices 5 has a drive wheel 53, front and rear driven wheels 54, a traveling motor 55, a crawler belt 56, and a plurality of track rollers 57. The front and rear driven wheels 54 and the track rollers 57 are supported on the track frame 14 rotatably about the lateral axis (axis in the machine body width direction). The traveling motor 55 is attached to the motor attachment portion 15. The drive wheel 53 is attached to the traveling motor 55, and driven by this traveling motor 55 and rotated about the lateral axis. The crawler belt 56 is formed by an endless belt and looped over the front and rear driven wheels 54, the track rollers 57, and the drive wheel 53. By rotating the drive wheel 53, the crawler belt 56 cyclically runs in the circumferential direction, and the working machine 1 goes forward or rearward. It should be noted that as shown in FIG. 14, the traveling devices 5 may be wheel type traveling devices 5.

As shown in FIG. 11, each of the working devices 4 has a boom 58, a working tool 59, a lift link 60, a control link 61, a boom cylinder 62, and a working tool cylinder (bucket cylinder) 63. The boom 58 is provided on the side of the machine body 2 and on the side of the cabin 3 oscillatably in the up and down direction (up-down direction). The booms 58 are respectively provided on the right side and the left side of the cabin 3. The inner wall 18 is provided on the side of each of the booms 58 which is the machine body inner side. The outer wall 19 is provided on the side of the boom 58 which is the side opposite to the inner wall 18 (machine body outer side).

A bucket is provided as the working tool 59 in the first embodiment. This bucket 59 is placed in the boom 58. In detail, the bucket 59 is provided in a leading end part (front end part) of the boom 58 oscillatably in the up and down direction. The lift link 60 and the control link 61 support a base part (rear part) of the boom 58 in such a manner that the boom 58 is oscillatably in the up and down direction. By being extended and contracted, the boom cylinder 62 lifts and lowers the boom 58. By being extended and contracted, the working tool cylinder 63 oscillates the bucket 59.

Each of the left and right booms 58 is provided at a position corresponding to a part between the inner wall 18 and the outer wall 19 of the support frame 16. If the left boom 58L is a boom, the right boom 58R is an additional boom. If the right boom 58R is a boom, the left boom 58L is an additional boom. Front parts of the left and right booms 58 are coupled to each other by a coupling member 64, and the base parts of the booms 58 are coupled to each other by a coupling member 64.

The lift links 60, the control links 61, and the boom cylinders 62 are respectively provided on the left side and the right side of the machine body 2 in correspondence with the left and right booms 58.

As shown in FIG. 1, the lift link 60 is vertically provided in a rear part of the base part of the boom 58. An upper part (one end side) of this lift link 60 is supported on a rear base part of the boom 58 pivotably rotatably about the lateral axis by a pivot shaft (first pivot shaft) 66. A lower part (other end side) of the lift link 60 is inserted between the inner wall 18 and the outer wall 19. The lower part of this lift link 60 is supported between the inner wall 18 and the support plate 49 pivotably rotatably about the lateral axis by a pivot shaft (second pivot shaft) 67. More specifically, as seen in FIGS. 12 and 13, if the left boom 58L is a boom and the right boom 58R is an additional boom, the left boom 58L is supported by the support frame 16 via the pivot shaft 67, the lift link 60, and the pivot shaft 66. If the left boom 58L is a boom and the right boom 58R is an additional boom, the right boom 58R is supported by the support frame 16 via an additional pivot shaft 67A, and an additional lift link 60A, and an additional pivot shaft 66A.

Therefore, the inner wall 18 is provided on the side of the lift link 60 which is the machine body inner side. The outer wall 19 is provided on the side of the lift link 60 which is the side opposite to the inner wall 18 (machine body outer side).

A cylinder tube 68 of the boom cylinder 62 is provided between the inner wall 18 and the outer wall 19. Therefore, the inner wall 18 is provided on the side of the boom cylinder 62 which is the machine body inner side. The outer wall 19 is provided on the side of the boom cylinder 62 which is the side opposite to the inner wall 18 (machine body outer side).

This cylinder tube 68 is positioned on the front side of the lift link 60, and inserted through the through hole 48 (refer to FIG. 6). An upper part (piston rod) of the boom cylinder 62 is supported on the base part of the boom 58 pivotably rotatably about the lateral axis by a pivot shaft (third pivot shaft) 69. The third pivot shaft 69 is positioned on the front side of the first pivot shaft 66.

A lower part (on the bottom side of the cylinder tube 68) of the boom cylinder 62 is supported between the cylinder support portions 52 of the cylinder attachment portion 25 pivotably rotatably about the lateral axis by a pivot shaft (fourth pivot shaft) 70. The fourth pivot shaft 70 is positioned on the lower side of the second pivot shaft 67.

The control link 61 is provided on the front side of the lift link 60 and on the side of a lower part of the base part of the boom 58. One end of the control link 61 is supported on the link attachment portion 41 pivotably rotatably about the lateral axis by a pivot shaft (fifth pivot shaft) 71. The other end of the control link 61 is supported on the lower part of the base part of the boom 58 pivotably rotatably about the lateral axis by a pivot shaft (sixth pivot shaft) 72. The fifth pivot shaft 71 is positioned on the front side of the third pivot shaft 69. The sixth pivot shaft 72 is positioned between the first pivot shaft 66 and the third pivot shaft 69. The sixth pivot shaft 72 is positioned on the front side and the upper side of the second pivot shaft 67.

Figure 9:
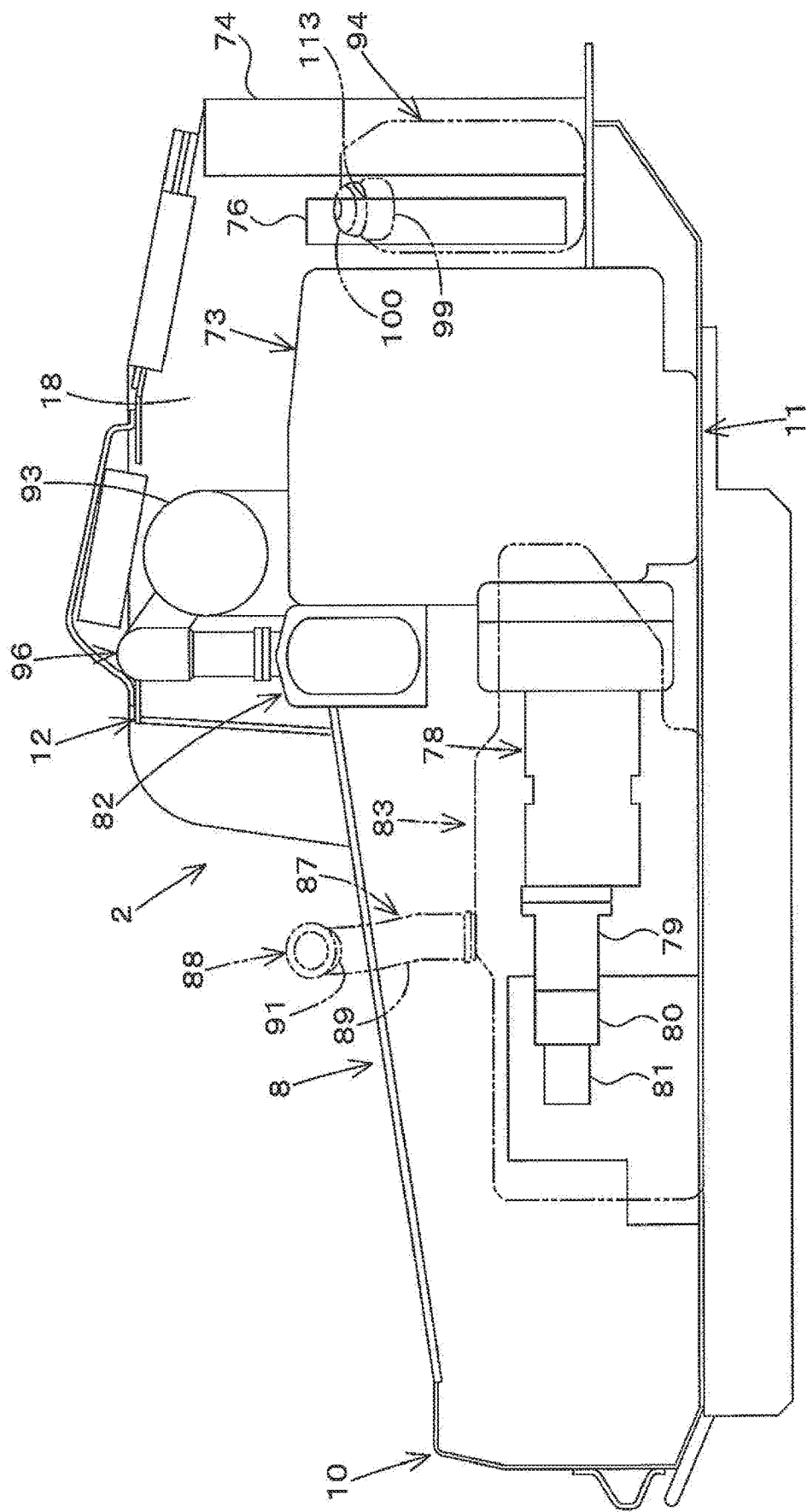
FIG. 9 is a side view of an interior of the machine body according to the first embodiment.
Figure 10:
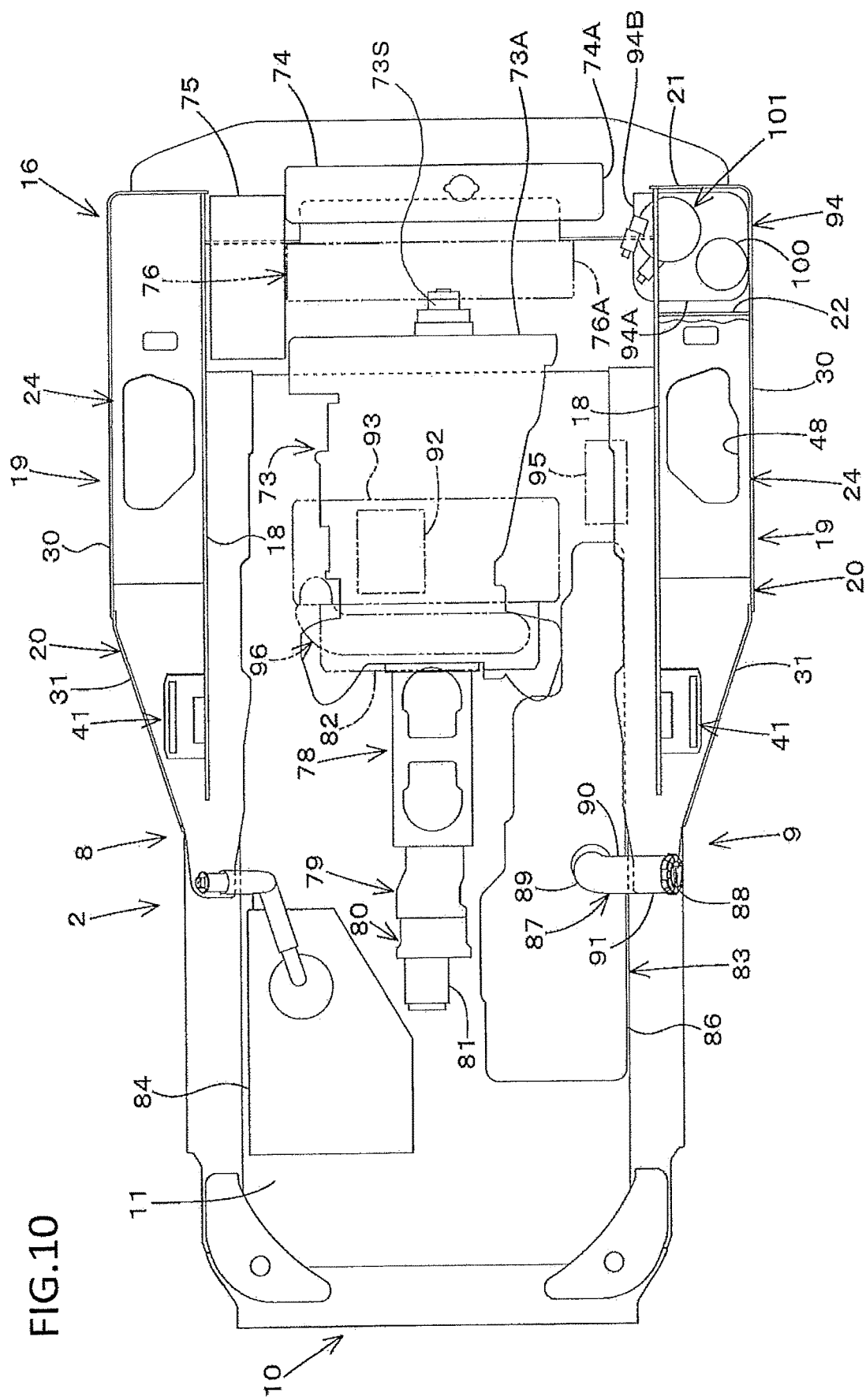
FIG. 10 is a plan view of the interior of the machine body according to the first embodiment.

As shown in FIGS. 9 and 10, an engine (diesel engine) 73, a radiator 74, and a battery 75 are mounted in the rear part in the machine body 2. The radiator 74 is provided on the rear side of the engine 73. A cooling fan 76 is provided between the engine 73 and the radiator 74. This cooling fan 76 is driven by an output shaft 73S of the engine 73 and blows air toward the rear side (radiator 74). The battery 75 is provided on the right side of the cooling fan 76. A part on the rear side of the radiator 74 is covered by a bonnet cover 77. This bonnet cover 77 is attached to rear ends of the support frames 16. The cooling wind generated by the cooling fan 77 is discharged to the rear side of the machine body 2 through an air ventilation part formed in the bonnet cover 77.

In a part on the front side of the engine 73, a plurality of hydraulic pumps 78, 79, 80, 81 is provided in line in the front and rear direction. In the first embodiment, the hydraulic pump 78 is a traveling pump, the hydraulic pump 79 is a main pump, the hydraulic pump 80 is a sub pump, and the hydraulic pump 81 is a pilot pump. These hydraulic pumps 78, 79, 80, 81 supply working oil in a working oil tank 84 to predetermined hydraulic devices via control valves.

The traveling pump 78 is a hydraulic pump that drives the traveling motors (hydraulic motors) 55. In addition, this traveling pump 78 is a variable capacity hydraulic pump forming part of a hydrostatic continuously variable transmission together with the traveling motors 55. The main pump 79, the sub pump 80, and the pilot pump 81 are constant capacity gear pumps. The main pump 79 is a hydraulic pump that drives hydraulic actuators installed in the working devices 4 and hydraulic actuators installed in hydraulic attachment which are attached to the working devices 4. The sub pump 80 is a hydraulic pump used for increasing an amount of the working oil. The pilot pump 81 is mainly used for supplying control signal pressure.

A particle removal device 82 is provided on the front side of an upper part of the engine 73. This particle removal device 82 is formed by a DPF (Diesel Particulate Filter) in the first embodiment. This DPF 82 is connected to an exhaust manifold of the engine 73, and removes minute particles containing harmful substances in an exhaust gas of the engine 73.

A fuel tank 83 and the working oil tank 84 are mounted in the front part in the machine body 2. The working oil tank 84 is a tank that stores the working oil for activating the hydraulic actuators, the tank being provided on the right side in the machine body 2.

The fuel tank 83 is a tank that stores fuel of the engine 73, the tank being provided on the left side in the machine body 2. This fuel tank 83 extends forward from the left side of a front part of the engine 73. This fuel tank 83 has a fuel tank main body (referred to as the first tank main body) 86, a feeding pipe (referred to as the first feeding pipe) 87, and a cap (referred to as the first cap) 88. The fuel is stored in the first tank main body 86. The first feeding pipe 87 has a first pipe portion 89 extending upward from a front-rear intermediate part on an upper surface of the first tank main body 86, and a second pipe portion 90 extending from this first pipe portion 89 toward the machine body outer side (left side). The second pipe portion 90 is positioned on the upper side of the main frame 13. A left end part of the second pipe portion 90 serves as a feeding port (referred to as the first feeding port) 91 opened toward the left side. The fuel is fed from this first feeding port 91. Therefore, the fuel can be fed to the fuel tank 83 from the left side of the machine body 2 which is the outer side of the machine body 2. The first feeding port 91 is openably closed by the first cap 88.

The working machine 1 has a urea SCR (Selective Catalytic Reduction) system. This urea SCR system is a system to, by injecting a urea aqueous solution into a distribution route through which the exhaust gas of the engine is distributed, hydrolyze the urea aqueous solution under a high temperature, generate an ammonia gas, and reduce nitrogen oxide to a nitrogen gas and water vapor by this ammonia gas. Accordingly, the urea SCR system can eliminate nitrogen oxide in an exhaust gas discharged from an engine.

The urea aqueous solution in a liquid state is stored in a urea aqueous solution tank and mounted in the working machine. The melting point of this urea aqueous solution is −11° C. Thus, there is a fear that the urea aqueous solution is frozen by a decrease in an ambient temperature. When a temperature of the urea aqueous solution is increased to be a predetermined temperature (such as 50° C.) or higher, part of the urea aqueous solution is gasified and evaporated, and concentration of the urea aqueous solution is changed. Therefore, the urea aqueous solution tank has to be arranged in a place where a temperature environment is favorable.

As shown in FIGS. 9 and 10, this urea SCR system has a SCR catalyst (selective catalytic reduction catalyst) 92, a catalyst case 93 accommodating this SCR catalyst 92, a urea aqueous solution tank 94, and a SCR pump 95.

The catalyst case 93 is provided on the rear side of the DPF 82 and on the upper side of the front part of the engine 73. This catalyst case 93 is connected to the DPF 82 via a connection pipe 96.

The urea aqueous solution tank 94 is a tank that stores a urea aqueous solution. The SCR pump 95 is connected to the urea aqueous solution tank 94 and the connection pipe 96 by hoses (not shown). This SCR pump 95 pumps up the urea aqueous solution in the urea aqueous solution tank 94 and injects the urea aqueous solution into the connection pipe 96 via an injection nozzle. The urea aqueous solution injected into the connection pipe 96 is hydrolyzed under a high temperature by the exhaust gas of the engine 73 passing through the DPF 82. Thereby, an ammonia gas is generated, and by this ammonia gas, nitrogen oxide in the exhaust gas of the engine 73 is reduced to a nitrogen gas and water vapor. This reduction reaction is facilitated by the SCR catalyst 92 in the catalyst case 93. The purified exhaust gas of the engine 73 is discharged to the atmosphere from the catalyst case 93.

As shown in FIG. 1, the urea aqueous solution tank 94 is provided on the rear side of the lift link 60 and the boom cylinder 62 and on the lower side of the boom 58. The urea aqueous solution tank 94 is disposed on the bottom plate 23.

As shown in FIGS. 1 and 2, the urea aqueous solution tank 94 is provided between the front wall 20 and the rear wall 21. The urea aqueous solution tank 94 is also provided between the inner wall 18 and the outer wall 19 (by utilizing a space between the inner wall 18 and the outer wall 19). The urea aqueous solution tank 94 is provided between the partition wall 22 positioned on the rear side of the front wall 20, and the rear wall 21. In detail, the partition wall 22 is positioned on the front side of the urea aqueous solution tank 94, the rear wall 21 is positioned on the rear side of the urea aqueous solution tank 94, the outer wall 19 is positioned on the side of the urea aqueous solution tank 94 which is the side opposite to the inner wall 18, and the intermediate part 46 and the rear part 47 of the reinforcing wall 24 are positioned on the upper side of the urea aqueous solution tank 94. Therefore, an installment portion 97 in which the urea aqueous solution tank 94 is installed is formed by the bottom plate 23, the partition wall 22, the rear wall 21, the outer wall 19, and the intermediate part 46 and the rear part 47 of the reinforcing wall 24. It should be noted that it is sufficient if the urea aqueous solution tank 94 is provided between the front wall 20 and the rear wall 21. The urea aqueous solution tank 94 may be provided on the rear side of the cylinder tube 68 between the first part 34 of the front wall 20 and the rear wall 21, or may be provided in other places.

As shown in FIGS. 9 and 10, the urea aqueous solution tank 94 is provided on the side (left side) and the rear side of the engine 73. The urea aqueous solution tank 94 is provided on the rear side of the engine 73 and on the side (left side) of the radiator 74. As shown in FIGS. 1 and 11, the urea aqueous solution tank 94 is provided on the rear side of the traveling device 5. In other words, the installment portion 97 is positioned on the left side and the rear side of the engine 73. The installment portion 97 is positioned on the rear side of the engine 73 and on the left side of the radiator 74. Further, the installment portion 97 is provided on the rear side of the traveling device 5.

Further in detail, the urea aqueous solution tank 94 is provided in such a manner that a front surface 94A of the urea aqueous solution tank 94 is positioned on the rear side of a back surface 73A of the engine 73. The urea aqueous solution tank 94 is provided in such a manner that a side surface 94B of the urea aqueous solution tank 94 and a side surface 74A of the radiator 74 are overlapped with each other in the machine body width direction. The urea aqueous solution tank 94 is provided in such a manner that the side surface 94B of the urea aqueous solution tank 94 and a side surface 76A of the cooling fan 76 are overlapped with each other in the machine body width direction. The urea aqueous solution tank 94 is provided in such a manner that the front surface 94A of the urea aqueous solution tank 94 and the crawler belt 56 are overlapped with each other in the front and rear direction on the rear side of the traveling device 5.

It should be noted that in the first embodiment, the urea aqueous solution tank 94 (installment portion 97) meets all a first condition to be positioned on the side and the rear side of the engine 73, a second condition to be secondly positioned on the side of the radiator 74, and a third condition to be positioned on the rear side of the traveling device 5. However, the urea aqueous solution tank 94 may be installed so as to meet any of the first to third conditions. The urea aqueous solution tank 94 has a urea aqueous solution tank main body (referred to as the second tank main body) 98, a feeding pipe (referred to as the second feeding pipe) 99, a cap (referred to as the second cap) 100, a supply portion 101, and a discharge portion 102.

The urea aqueous solution is stored in the second tank main body 98. A machine body inner part of this second tank main body 98 is extended over from the installment portion 97 to the side where the engine 73 is arranged via the cut-away portion 26. As shown in FIG. 3, on the upper surface side of the second tank main body 98 and on the machine body outer side (left side), an insertion port 103 formed by an annular edge portion is formed. The second tank main body 98 is formed into an upright form in which up-down width is greater than front-rear width.

As shown in FIG. 4, the second tank main body 98 is fixed by an attachment plate 104. This attachment plate 104 is provided in an up-down intermediate part of the second tank main body 98 on the machine body inner side of the second tank main body 98. A front end part of the attachment plate 104 serves as a catching portion 105, and a rear end part of the attachment plate 104 serves as an attachment portion 114. The catching portion 105 is caught onto the locking member 32 provided in the inner wall 18. The attachment portion 114 is fixed to the stay 37 provided in the rear wall 21 by a bolt 106. By this attachment plate 104, the second tank main body 98 is pushed onto the outer wall 19. Thereby, the second tank main body 98 is fixed. It should be noted that a cushion member 107 is provided between the second tank main body 98 and the outer wall 19, and a cushion member 107 is provided between the second tank main body 98 and the attachment plate 104.

A gap 108 is provided between the second tank main body 98 and the partition wall 22, and a gap 108 is provided between the second tank main body 98 and the rear wall 21.

As shown in FIG. 3, the second feeding pipe 99 is a pipe for feeding the urea aqueous solution into the second tank main body 98. This second feeding pipe 99 is inserted into the second tank main body 98 from the insertion port 103. The second feeding pipe 99 is attached to an attachment member 109 formed by a plate material. The attachment member 109 has a recessed portion 110 recessed inward from the machine body outer side, and a flange portion 111 extended from an end part of this recessed portion 110. The recessed portion 110 is inserted into the installment portion 97 from the placement hole 33. An upper part of the second feeding pipe 99 is fixed to a bottom wall 112 of this recessed portion 110. The flange portion 111 is overlapped with a circumference of the placement hole 33 on an outer surface of the outer wall 19 and fixed by a screw or the like.

A feeding port (referred to as the second feeding port) 113 is formed in an upper end of the second feeding pipe 99. The urea aqueous solution is fed from this second feeding port 113. The urea aqueous solution can be fed to the urea aqueous solution tank 94 from the left side of the machine body 2 which is the outer side of the machine body 2. Therefore, the first feeding port 91 serving as the feeding port of the fuel tank 83 and the second feeding port 113 serving as the feeding port of the urea aqueous solution tank 94 are arranged in a side part of the machine body 2 on the same side.

The second feeding port 113 is openably closed by the second cap 100. The second feeding port 113 and the second cap 100 are positioned in the recessed portion 110.

As shown in FIG. 2, the supply portion 101 is a portion from which the urea aqueous solution is discharged in order to supply the urea aqueous solution into the exhaust gas of the engine 73, and is connected to the SCR pump 95 by the hose.

The discharge portion 102 is a portion from which the urea aqueous solution is discharged in order to remove the urea aqueous solution in the urea aqueous solution tank 94, and is provided at a position corresponding to the opening portion 42 of the bottom plate 23. Therefore, by detaching the lid plate 43, the urea aqueous solution in the urea aqueous solution tank 94 can be discharged to the lower side of the machine body 2 from the discharge portion 102.

There is a fear that the urea aqueous solution is frozen by a decrease in an ambient temperature. When a temperature of the urea aqueous solution is increased to be a predetermined temperature or higher, part of the urea aqueous solution is gasified and evaporated, and concentration of the urea aqueous solution is changed. Therefore, the urea aqueous solution tank 94 is desirably arranged in a place where a temperature environment is favorable. In the first embodiment, a place surrounded by the bottom plate 23, the partition wall 22, the rear wall 21, the outer wall 19, and the intermediate part 46 and the rear part 47 of the reinforcing wall 24 serves as the installment portion in which the urea aqueous solution tank 94 is installed. Thereby, the urea aqueous solution tank 94 is installed in the place where the temperature environment is favorable, so that the urea aqueous solution tank 94 can be favorably mounted in the working machine 1 such as a compact track loader having the booms 58 provided on the sides of the machine body 2 and the cabin 3 and the lift links 60 pivotably supported on the rear parts of the booms 58.

The urea aqueous solution tank 94 is arranged on the side of the cooling fan 76, and arranged in a place where the urea aqueous solution tank 94 is not exposed to the cooling wind passing through the radiator 74. In other words, the urea aqueous solution tank 94 is arranged on the side where the cooling fan 76 suctions air. Thereby, it can also be said that the temperature environment in the place where the urea aqueous solution tank 94 is arranged is favorable.

Since the urea aqueous solution tank 94 is formed into an upright form (vertically elongated), a remaining amount sensor that detects a remaining amount of the urea aqueous solution works properly. That is, with a horizontally elongated urea aqueous solution tank, when the working machine 1 is inclined, the urea aqueous solution is greatly slanted and the remaining amount sensor does not properly work. Meanwhile, with the upright urea aqueous solution tank 94, when the working machine 1 is inclined, the urea aqueous solution is not greatly slanted. Thus, the remaining amount sensor works properly.

Also in a case where a liquid level of the urea aqueous solution is seen in order to confirm the remaining amount of the urea aqueous solution, with the upright urea aqueous solution tank 94, inclination of the liquid level of the urea aqueous solution when the working machine 1 is inclined is more moderate. Thus, the amount of the urea aqueous solution is more easily found than with the horizontally elongated urea aqueous solution tank.

Since the installment portion 97 in which the urea aqueous solution tank 94 is installed is formed in a rear part of the support frame 16, height of the installment portion 97 can be sufficiently ensured and the upright urea aqueous solution tank 94 can be arranged.

Upon providing the urea aqueous solution tank 94 in the support frame 16, by providing the urea aqueous solution tank 94 on the rear side of the lift link 60, arrangement and structures of the members forming the working device 4 are not influenced.

Since the installment portion 97 is formed in the rear part of the support frame 16, installment of the urea aqueous solution tank 94 does not influence arrangement of other devices, members, and the like in the machine body 2.

The urea aqueous solution tank 94 is arranged on the inner side of the outer wall 19 of the support frame 16 forming the side part of the machine body 2, and the urea aqueous solution can be fed to the urea aqueous solution tank 94 from the outer side of the outer wall 19. Thereby, accessibility to the feeding port of the urea aqueous solution tank 94 is favorable, and the urea aqueous solution can be easily fed. The opening portion 42 is provided in the bottom plate 23 on which the urea aqueous solution tank 94 is disposed, and the discharge portion 102 is provided at the position corresponding to this opening portion 42. Thereby, accessibility to the discharge portion 102 of the urea aqueous solution tank 94 is favorable, and the urea aqueous solution in the urea aqueous solution tank 94 is easily drained.

By arranging the first feeding port 91 serving as the feeding port of the fuel and the second feeding port 113 serving as the feeding port of the urea aqueous solution in the side part of the machine body 2 on the same side, workability at the time of feeding the fuel and the urea aqueous solution is favorable.

By providing the gap 108 between the second tank main body 98 and the partition wall 22 and providing the gap 108 between the second tank main body 98 and the rear wall 21, when part of the urea aqueous solution is gasified and the second tank main body 98 is expanded, this expansion can be released to the front side and the rear side.

By providing the urea aqueous solution tank 94 on the side and the rear side of the engine 73, or by providing the urea aqueous solution tank 94 on the side of the radiator 74, or by providing the urea aqueous solution tank 94 on the rear side of the engine 73 and on the side of the radiator 74, the urea aqueous solution tank 94 can be arranged in a place not easily influenced by the temperature and the wind in the machine body 2. In particular, by bringing a part between the front wall 20 and the rear wall 21 in the support frame 16 into an environmentally excellent place not easily influenced by the temperature and the wind, and installing the urea aqueous solution tank 94 in the above place, freezing, evaporation, and the like of the urea aqueous solution can be suppressed. In addition, the urea aqueous solution tank 94 can be arranged in a place where height can be sufficiently ensured.

Second Embodiment

FIGS. 15 to 20 show a second embodiment of the present invention. Elements having substantially the same function as those in the first embodiment will be numbered the same here, and will not be described and/or illustrated again in detail here for the sake of brevity. The driver's seat 6 is attached to a bottom portion 126 of the cabin 3. A driver's exit 134 for a driver getting on and off is provided on a front surface of the cabin 3. This driver's exit 134 can be opened and closed by a transparent front panel 135. This front panel 135 can be opened and closed from the outer side of the cabin 3 (cabin exterior side) and the inner side (cabin interior side).

Figure 15:
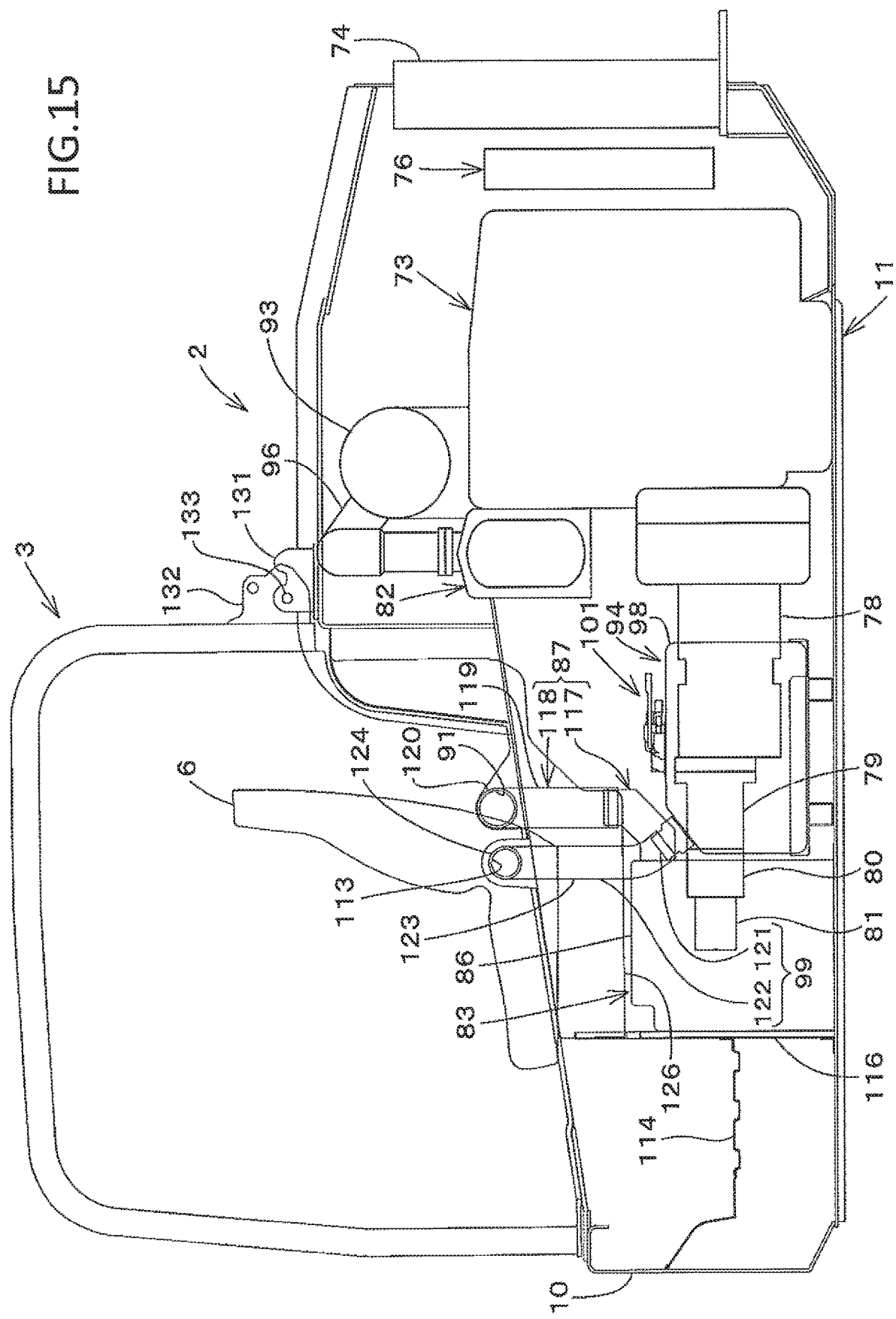
FIG. 15 is a schematic side view of an interior of a machine body according to a second embodiment.
Figure 16:
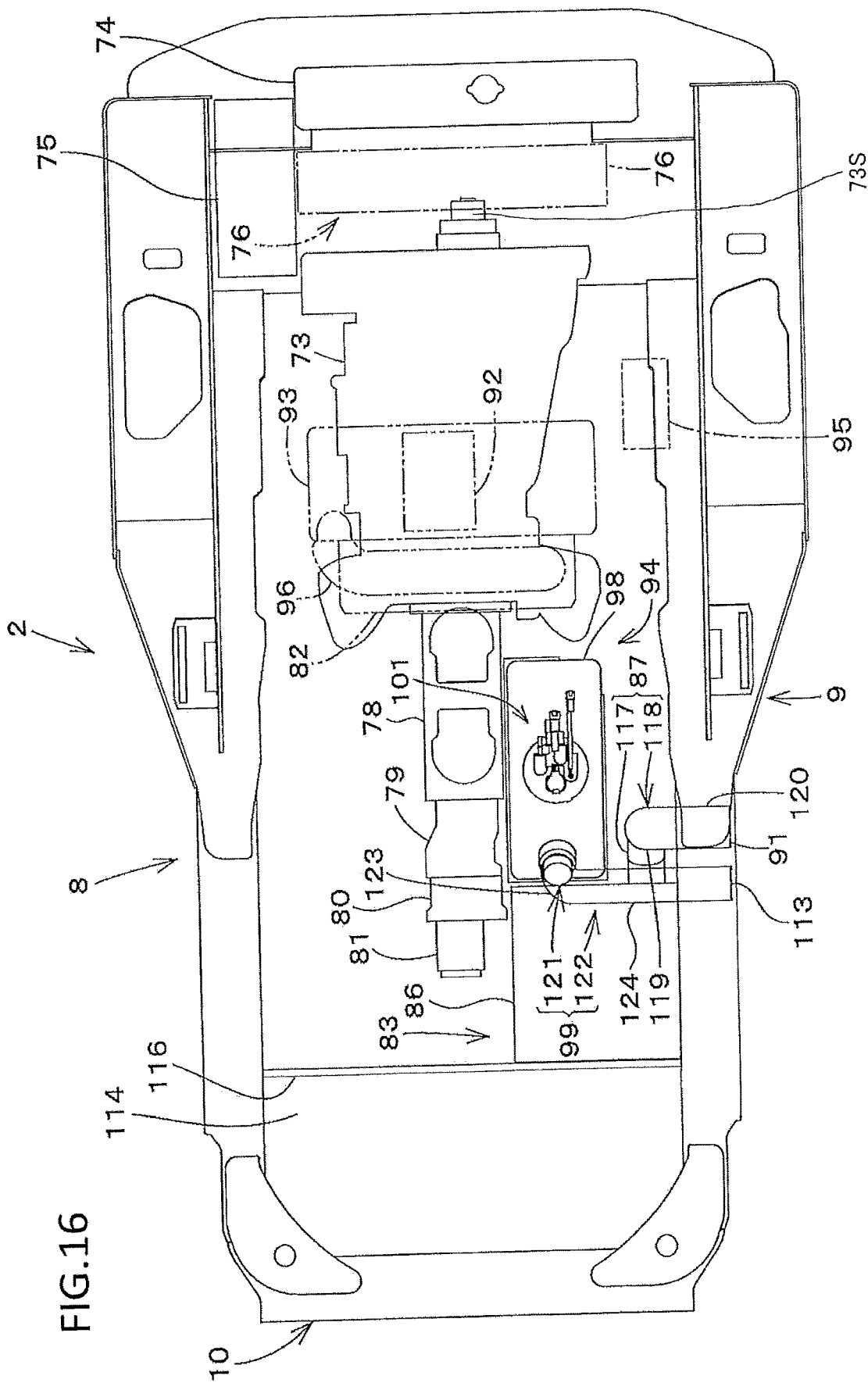
FIG. 16 is a schematic plan view of the interior of the machine body showing the second embodiment.
Figure 17:
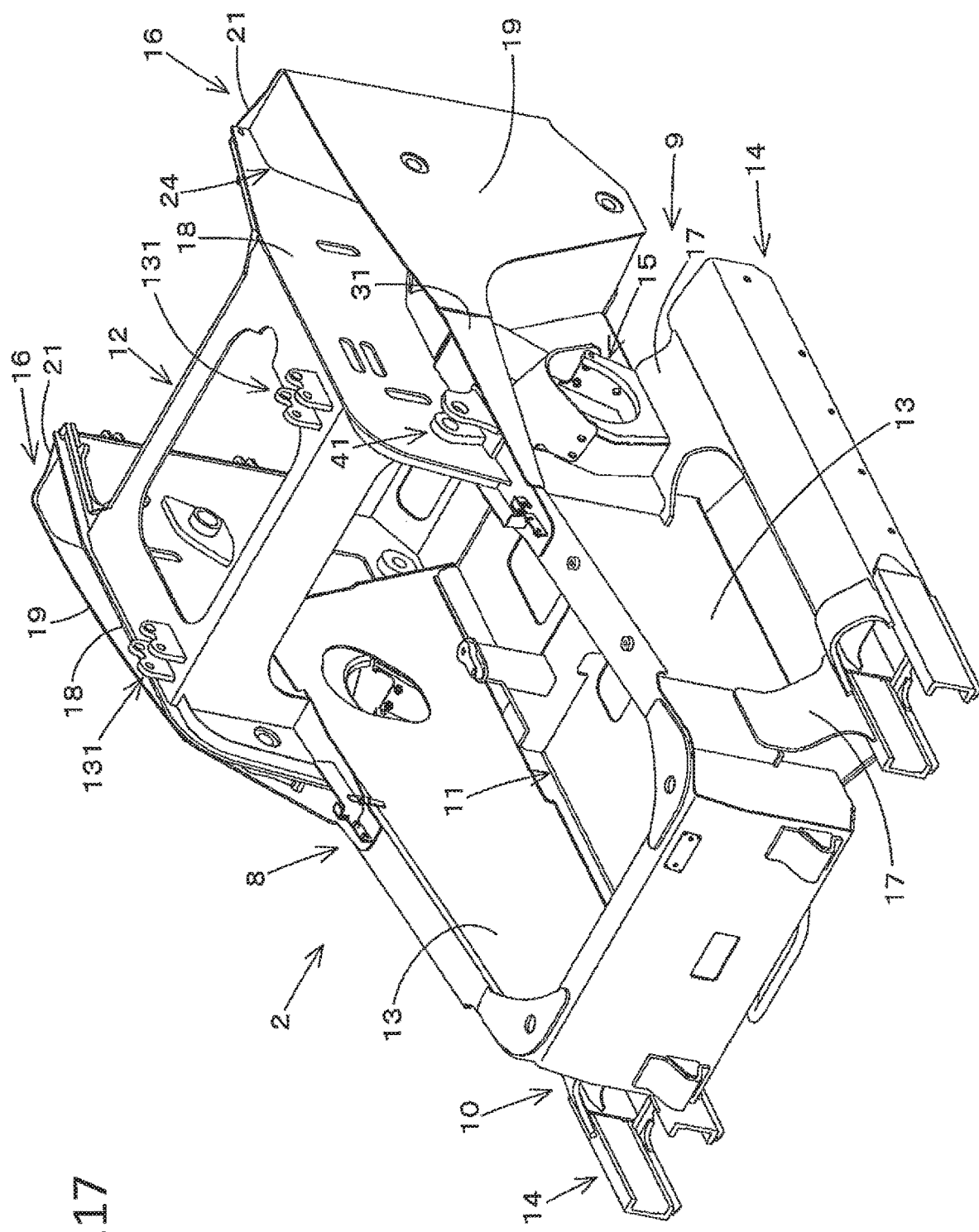
FIG. 17 is a perspective view of the machine body according to the second embodiment.

Pivotably supporting brackets 131 that pivotably supports the cabin 3 are provided in a front part of the upper frame portion 12. As shown in FIG. 15, coupling brackets 132 are provided in a back surface lower part of the cabin 3. The coupling brackets 132 (rear part of the cabin 3) are supported on the pivotably supporting brackets 131 pivotably rotatably about the lateral axis via a support shaft 133 in the machine body width direction. Therefore, by rotating the cabin 3 about the support shaft 133, the cabin 3 can be oscillated upward from a state where the cabin 3 is disposed on the machine body 2 shown in FIG. 15.

A vertical plate 116 and a step 114 are provided in the front part inside the machine body 2 on the front side of the driver's seat 6. The vertical plate 116 is vertically arranged in such a manner that plate surfaces face the front side and the rear side, and spaced from the front frame portion 10 on the rear side. The step 114 is a place on which the driver seated on the driver's seat 6 sets his/her feet. The step 114 is arranged between the front frame portion 10 and the vertical plate 116. The step 114 is provided at a height position of an up-down intermediate part of the front part of the machine body 2. The step 114 is provided ranging from the front frame portion 10 to the vertical plate 116, and also ranging from the right side frame portion 8 to the left side frame portion 9.

The step 114 and the vertical plate 116 are attached to the machine body 2. A rear end part of the step 114 is attached to the vertical plate 116. The bottom portion 126 of the cabin 3 is provided on the rear side of the step 114. Therefore, a lower surface part of the cabin 3 corresponding to the upper side of the step 114 is formed into an opened form.

Figure 18:
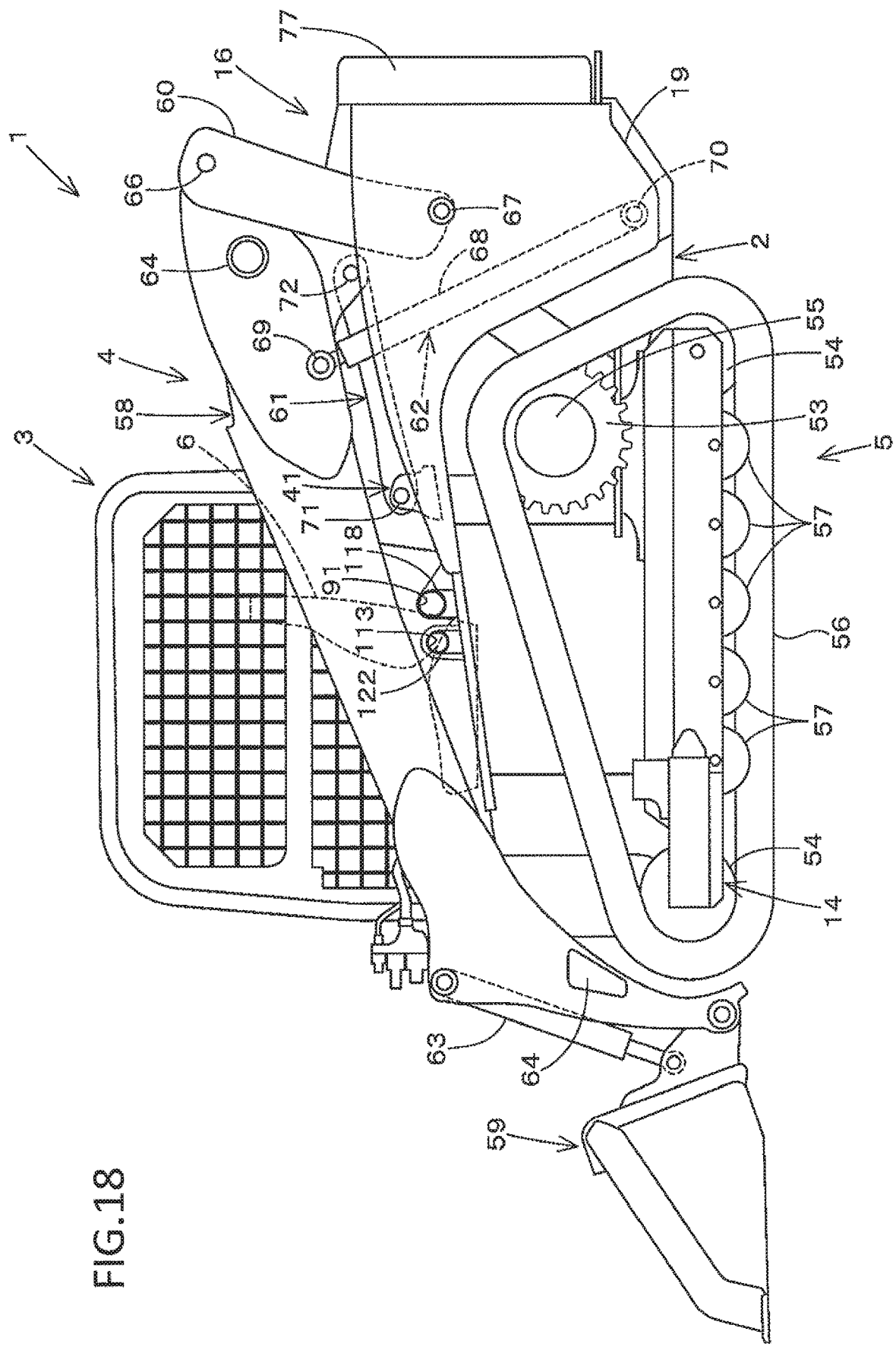
FIG. 18 is a side view of a working machine according to the second embodiment.
Figure 19:
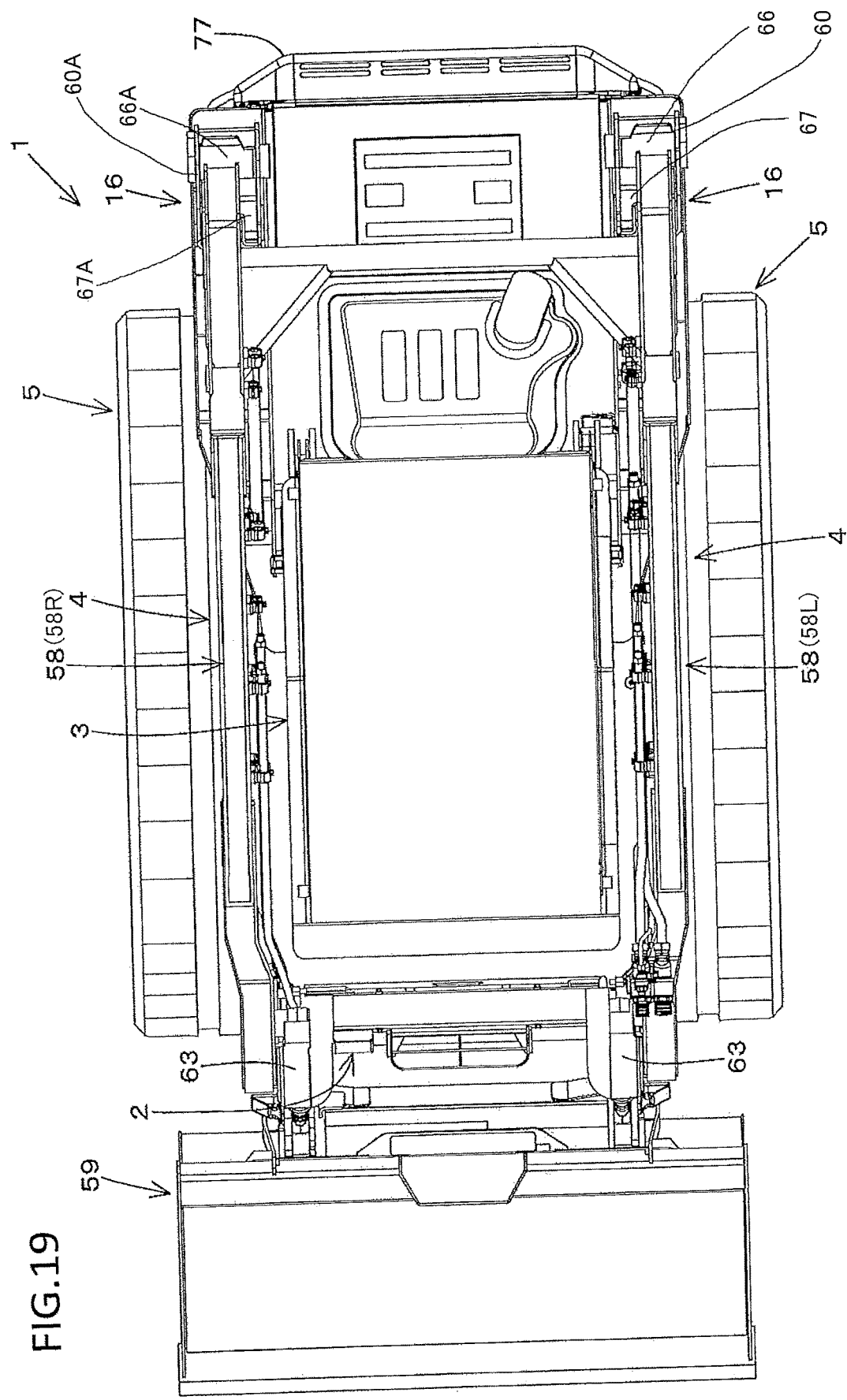
FIG. 19 is a plan view of the working machine according to the second embodiment.
Figure 20:
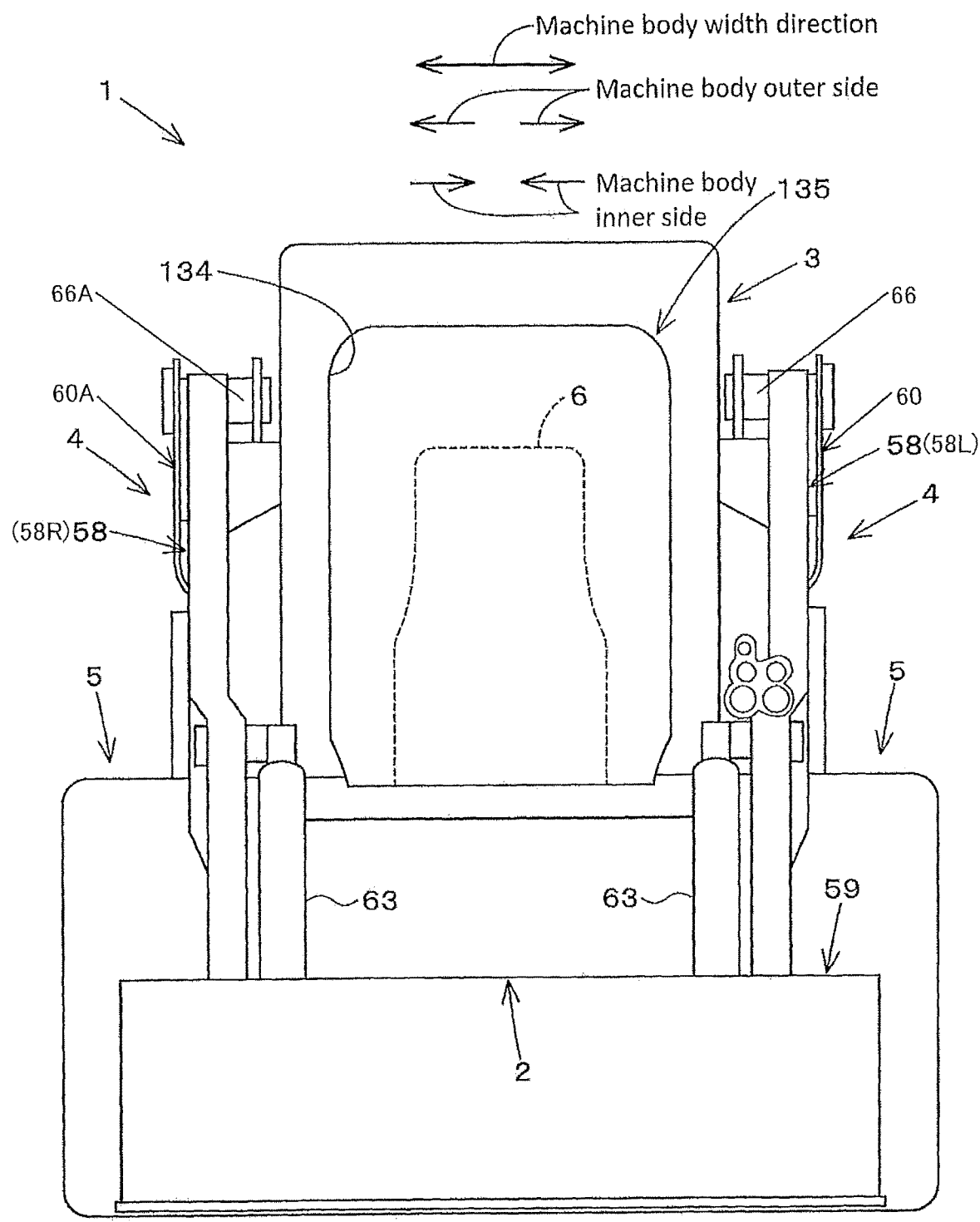
FIG. 20 is a front view of the working machine according to the second embodiment.
Figure 29:
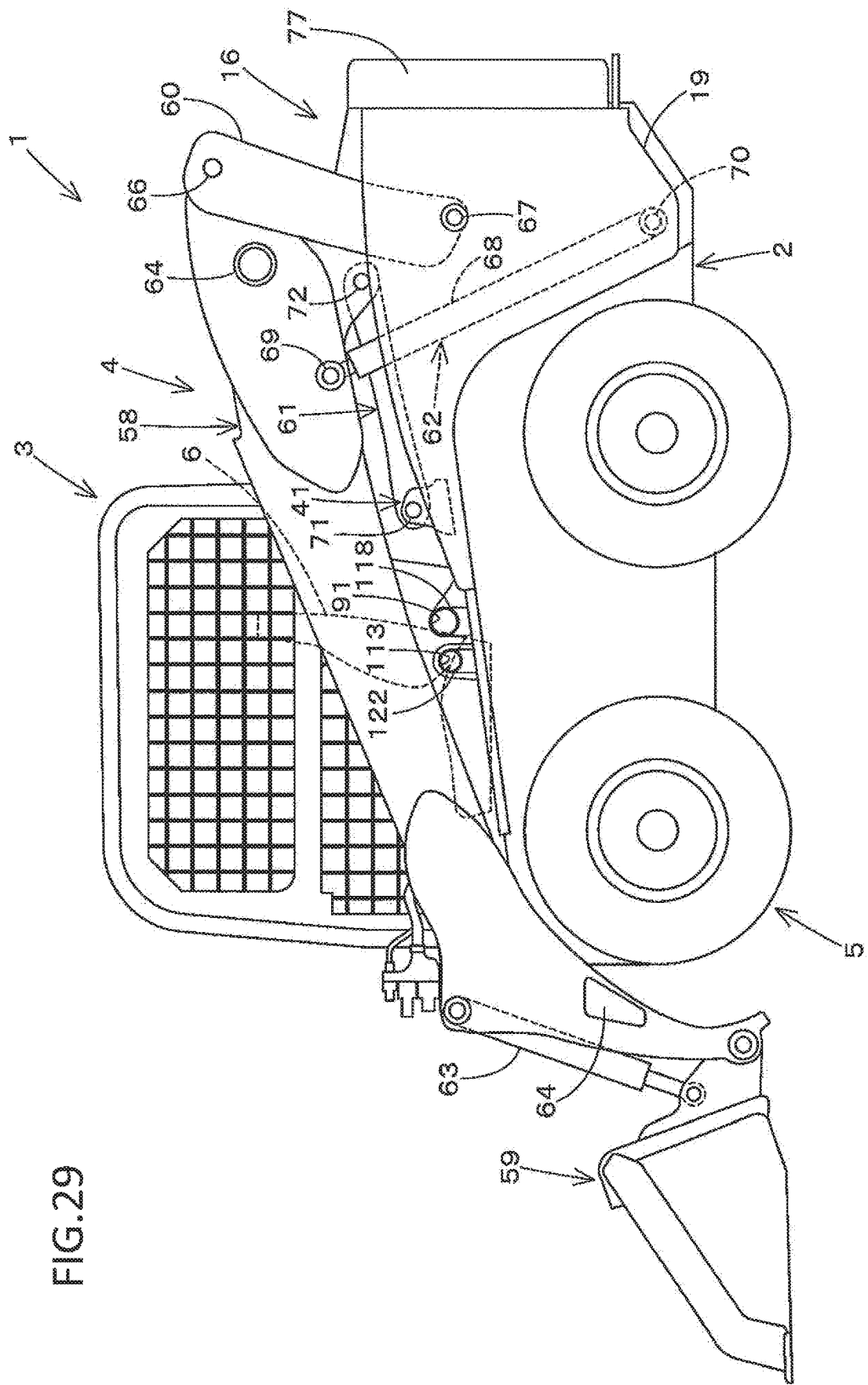
FIG. 29 is a side view of the working machine including wheel type traveling devices according to one variation of the second embodiment.

As shown in FIG. 18, crawler type traveling devices 5 are adopted as the traveling devices 5 in the second embodiment, too. The traveling devices 5 are provided on the left side and the right side of the machine body 2. It should be noted that as shown in FIG. 29, the traveling devices 5 may be wheel type traveling devices 5. A fuel tank 83 and a urea aqueous solution tank 94 are mounted in the front part in the machine body 2.

The fuel tank 83 and the urea aqueous solution tank 94 are provided on one side in the machine body width direction in the machine body 2. In the second embodiment, the tanks are provided on the left side in the machine body 2. The first feeding pipe 87 has a connection pipe (referred to as the first connection pipe) 117, and an extension pipe (referred to as the first extension pipe) 118. The first connection pipe 117 is provided in an upper and left part of a back surface of the first tank main body 86. One end of this first connection pipe 117 is connected to the first tank main body 86. The other end of the first connection pipe 117 is bent upward. A lower portion 119 of the first extension pipe 118 is connected to the first connection pipe 117 and extends upward from the first connection pipe 117. An upper portion 120 of the first extension pipe 118 extends toward the machine body outer side (left side) from an upper end of the lower portion 119 of the first extension pipe 118, and is positioned on the upper side of the main frame 13. A left end part of the upper portion 120 of this first extension pipe 118 serves as a feeding port (referred to as the first feeding port) 91 opened toward the left side.

The second feeding pipe 99 has a connection pipe (referred to as the second connection pipe) 121, and an extension pipe (referred to as the second extension pipe) 122. The second connection pipe 121 is provided in a front upper part of the second tank main body 98 on the left side of the second tank main body 98. One end of this second connection pipe 121 is connected to the second tank main body 98. The other end of the second connection pipe 121 is directed to the front obliquely upper side. A lower portion 123 of the second extension pipe 122 is connected to the second connection pipe 121 and extends upward from the second connection pipe 121. An upper portion 124 of the second extension pipe 122 extends toward the machine body outer side (left side) from an upper end of the lower portion 123 of the second extension pipe 122, and is positioned on the upper side of the main frame 13. A left end part of the upper portion 124 of this second extension pipe 122 serves as a feeding port (referred to as the second feeding port) 113 opened toward the left side.

The fuel tank 83 (first tank main body 86) is arranged on the rear side of the vertical plate 116 and in the vicinity of the vertical plate 116. The second tank main body 98 is arranged on the rear side of the first tank main body 86 and in the vicinity of the first tank main body 86. That is, a rear surface of the first tank main body 86 and a front surface of the second tank main body 98 face each other in the vicinity. The rear surface of the first tank main body 86 and the front surface of the second tank main body 98 are overlapped with each other in the front and rear direction.

The first extension pipe 118 is positioned on the rear side and in the vicinity of the second extension pipe 122. Therefore, the feeding port (first feeding port) 91 formed in the first feeding pipe 87 and the feeding port (second feeding port) 113 formed in the second feeding pipe 99 are directed to the same side (left side) and provided in line in the front and rear direction. The fuel and the urea aqueous solution can be fed from the same side of the machine body. Thereby, it is useful when the fuel and the urea aqueous solution are fed.

The urea aqueous solution tank 94 (second tank main body 98) and the fuel tank 83 (first tank main body 86) are provided on the front side of the engine 73. In the second embodiment, the second tank main body 98 is provided on the front side of the engine 73 and on the side (left side) of the hydraulic pumps 78, 79. The fuel tank 83 (first tank main body 86) is also provided on the front side of the engine 73 and on the side (left side) of the hydraulic pumps 80, 81.

That is, on the front side and the left side of the engine 73, the first tank main body 86 and the second tank main body 98 are provided. The second tank main body 98 is arranged between the first tank main body 86 and the engine 73.

Third Embodiment

Figure 21:
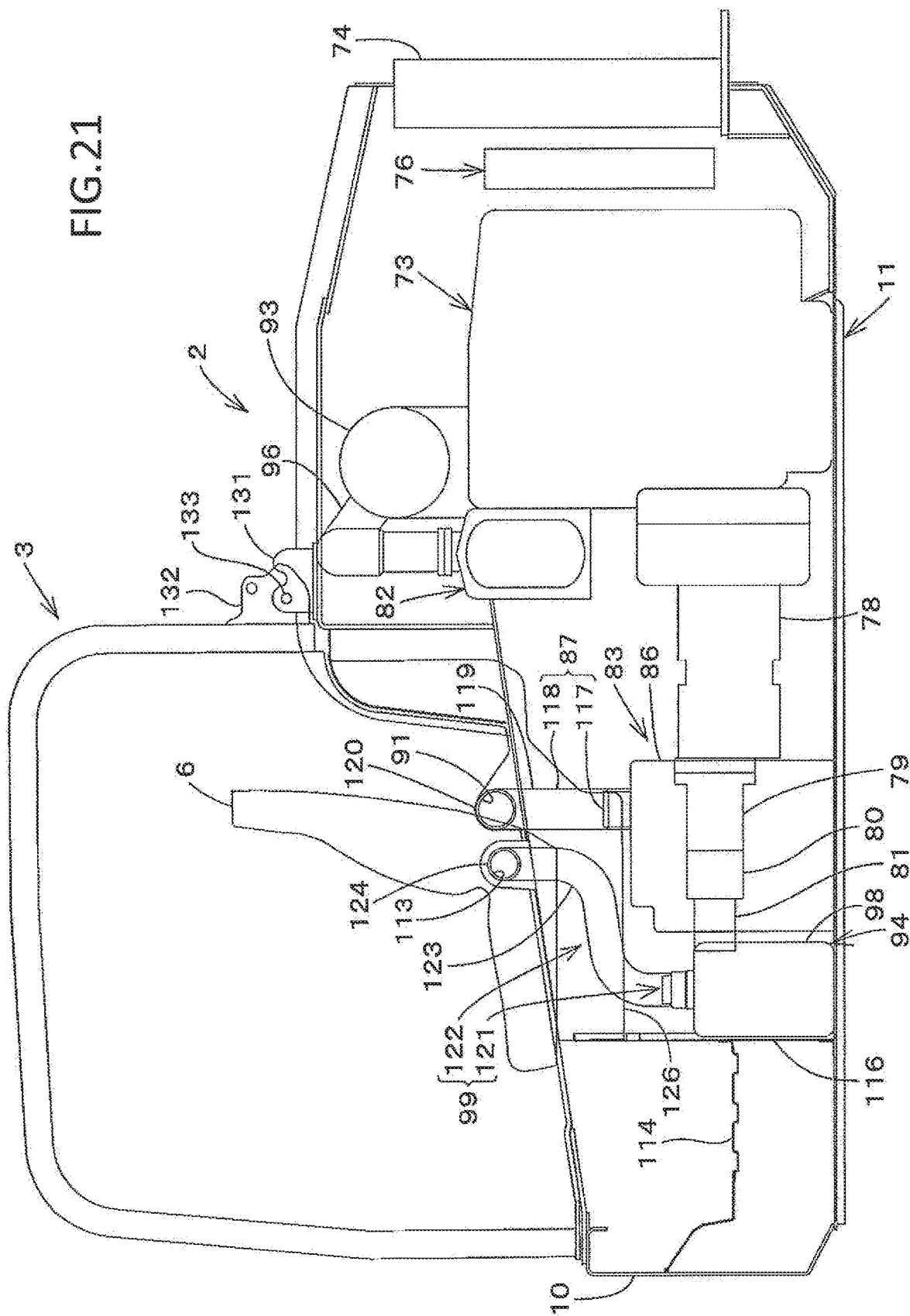
FIG. 21 is a schematic side view of an interior of a machine body showing a third embodiment.
Figure 22:
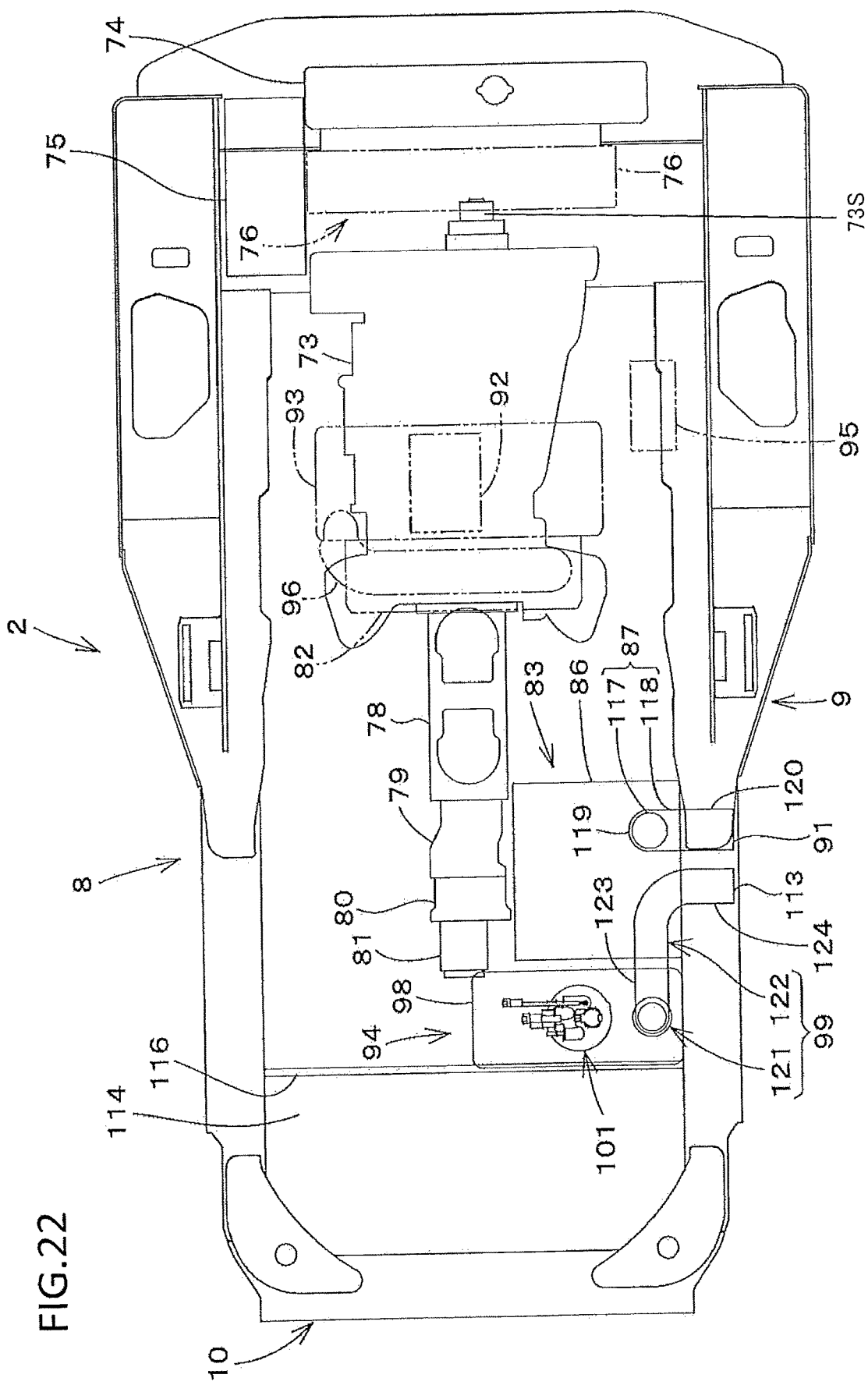
FIG. 22 is a schematic plan view of the interior of the machine body showing the third embodiment.

FIGS. 21 and 22 show a third embodiment of the present invention. Elements having substantially the same function as those in the second embodiment will be numbered the same here, and will not be described and/or illustrated again in detail here for the sake of brevity.

In the third embodiment, a urea aqueous solution tank 94 is arranged on the rear side of a vertical plate 116 and in the vicinity of the vertical plate 116. A first tank main body 86 (fuel tank 83) is arranged on the rear side of a second tank main body 98 and in the vicinity of the second tank main body 98. That is, a front surface of the first tank main body 86 and a rear surface of the second tank main body 98 face each other in the vicinity. The front surface of the first tank main body 86 and the rear surface of the second tank main body 98 are overlapped with each other in the front and rear direction.

The first tank main body 86 is provided on the front side of the engine 73 and on the side (left side) of the hydraulic pumps 79, 80, 81. The second tank main body 98 is provided on the front side of the engine 73 and on the front side of the hydraulic pump 81.

That is, on the front side and the left side of the engine 73, the first tank main body 86 and the second tank main body 98 are provided. The first tank main body 86 is arranged between the second tank main body 98 and the engine 73.

Also in the third embodiment, as well as the second embodiment, a first extension pipe 118 is positioned on the rear side and in the vicinity of a second extension pipe 122. A feeding port (first feeding port) 91 formed in a first feeding pipe 87 and a feeding port (second feeding port) 113 formed in a second feeding pipe 99 are directed to the same side (left side) and provided in line in the front and rear direction. The other configurations are the same as those of the second embodiment.

Fourth Embodiment

Figure 23:
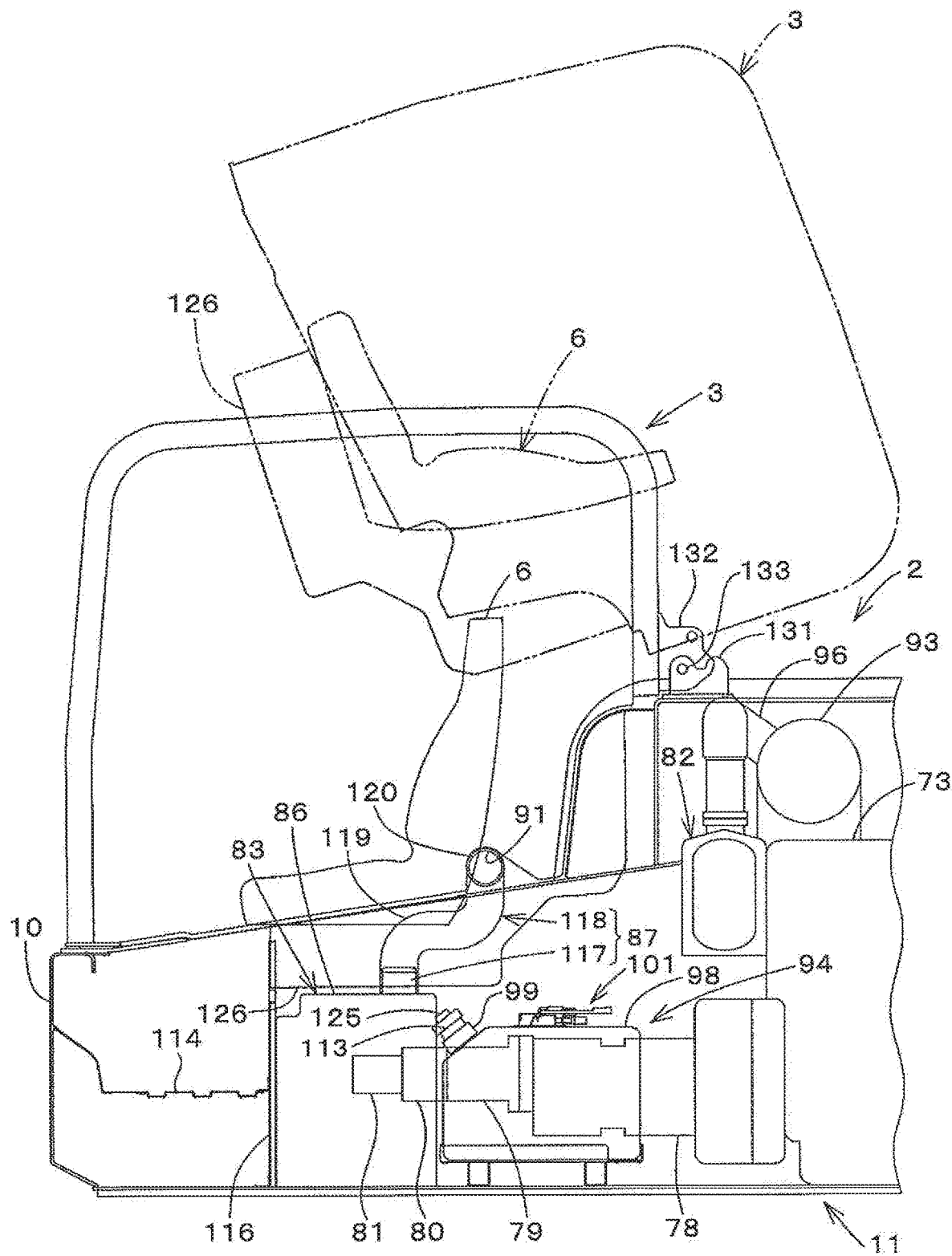
FIG. 23 is a schematic side view of an interior of a machine body showing a fourth embodiment.
Figure 24:
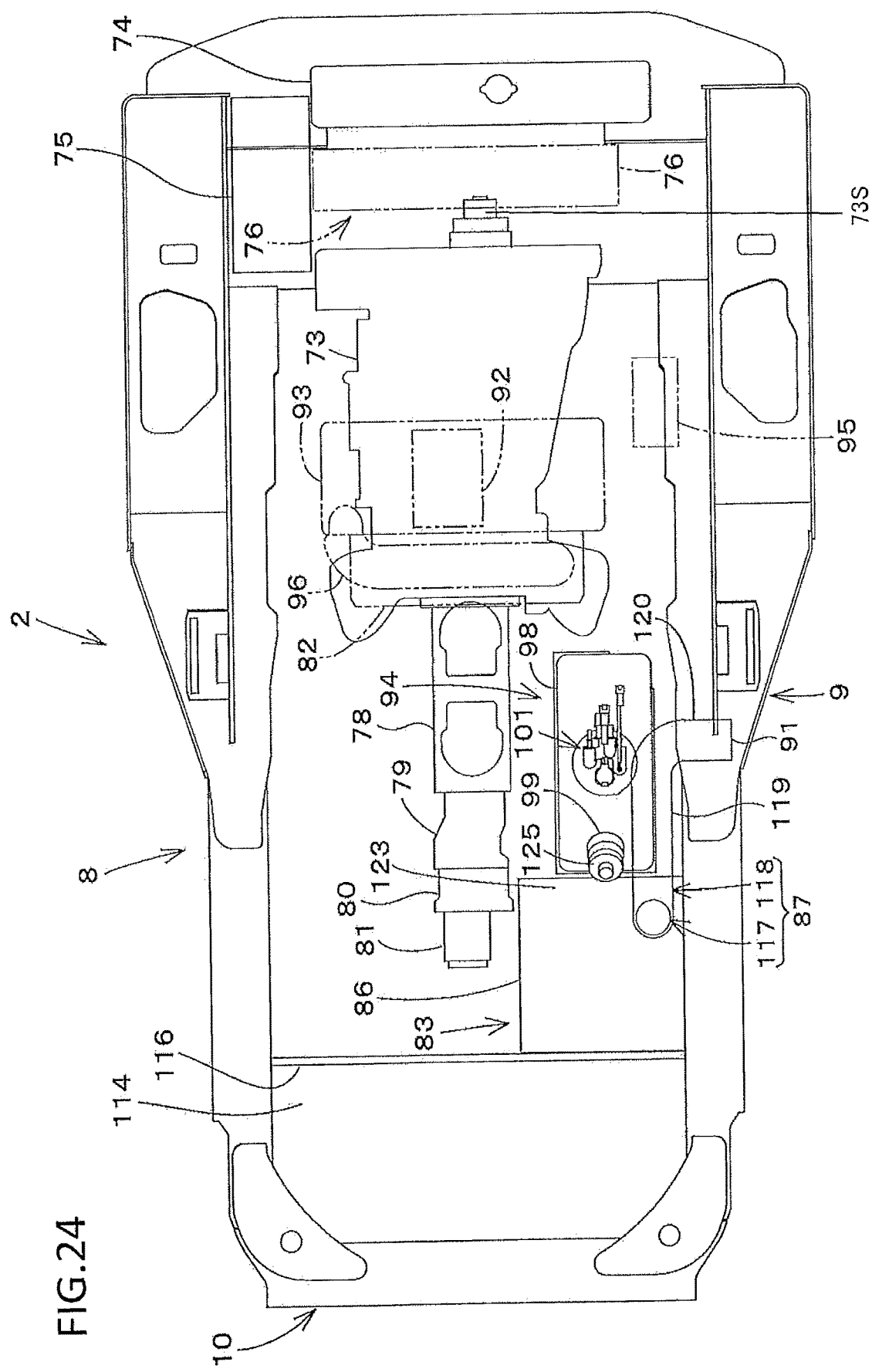
FIG. 24 is a schematic plan view of the interior of the machine body showing the fourth embodiment.

FIGS. 23 and 24 show a fourth embodiment. Elements having substantially the same function as those in the second and third embodiments will be numbered the same here, and will not be described and/or illustrated again in detail here for the sake of brevity.

In the fourth embodiment, a second feeding pipe 99 does not have the second extension pipe 122 described in the second embodiment. Therefore, this second feeding pipe 99 is formed by a single pipe member. A second feeding port 113 of this second feeding pipe 99 and a cap 125 closing this second feeding port 113 are positioned on the lower side of a bottom portion 126 of a cabin 3. In this fourth embodiment, the second feeding port 113 can be exposed to an exterior in a state where the cabin 3 is oscillated upward as shown by an imaginary line in FIG. 23. Therefore, in a case where a urea aqueous solution is fed to a urea aqueous solution tank 94, feeding is done in a state where the cabin 3 is oscillated upward. In addition, fuel is fed to a fuel tank 83 from the left side of a machine body 2 which is the outer side of the machine body 2. Thereby, a confusion of feeding of the urea aqueous solution with feeding of the fuel can be prevented. The other configurations are the same as those of the second embodiment.

Fifth Embodiment

Figure 25:
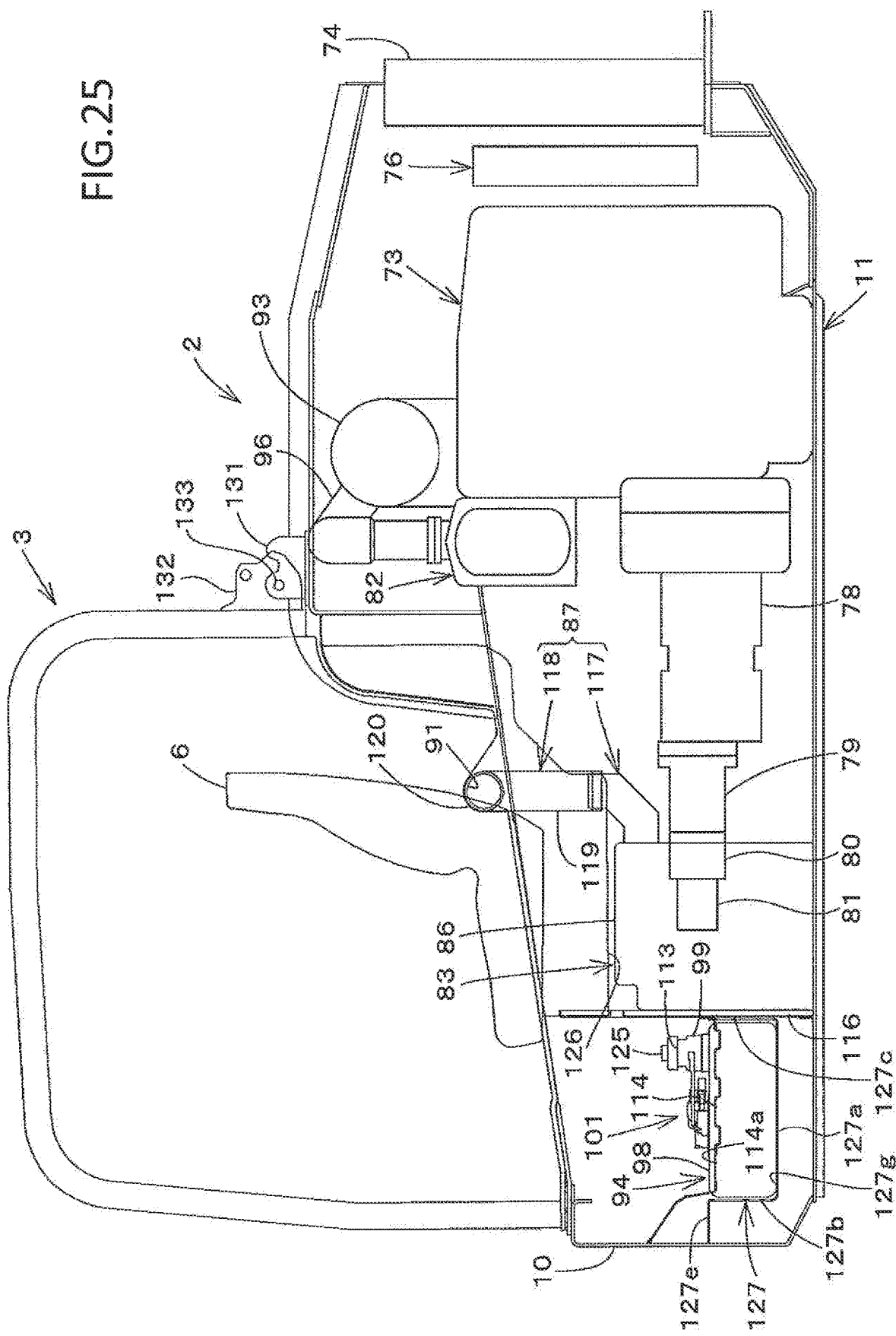
FIG. 25 is a schematic side view of an interior of a machine body showing a fifth embodiment.
Figure 26:
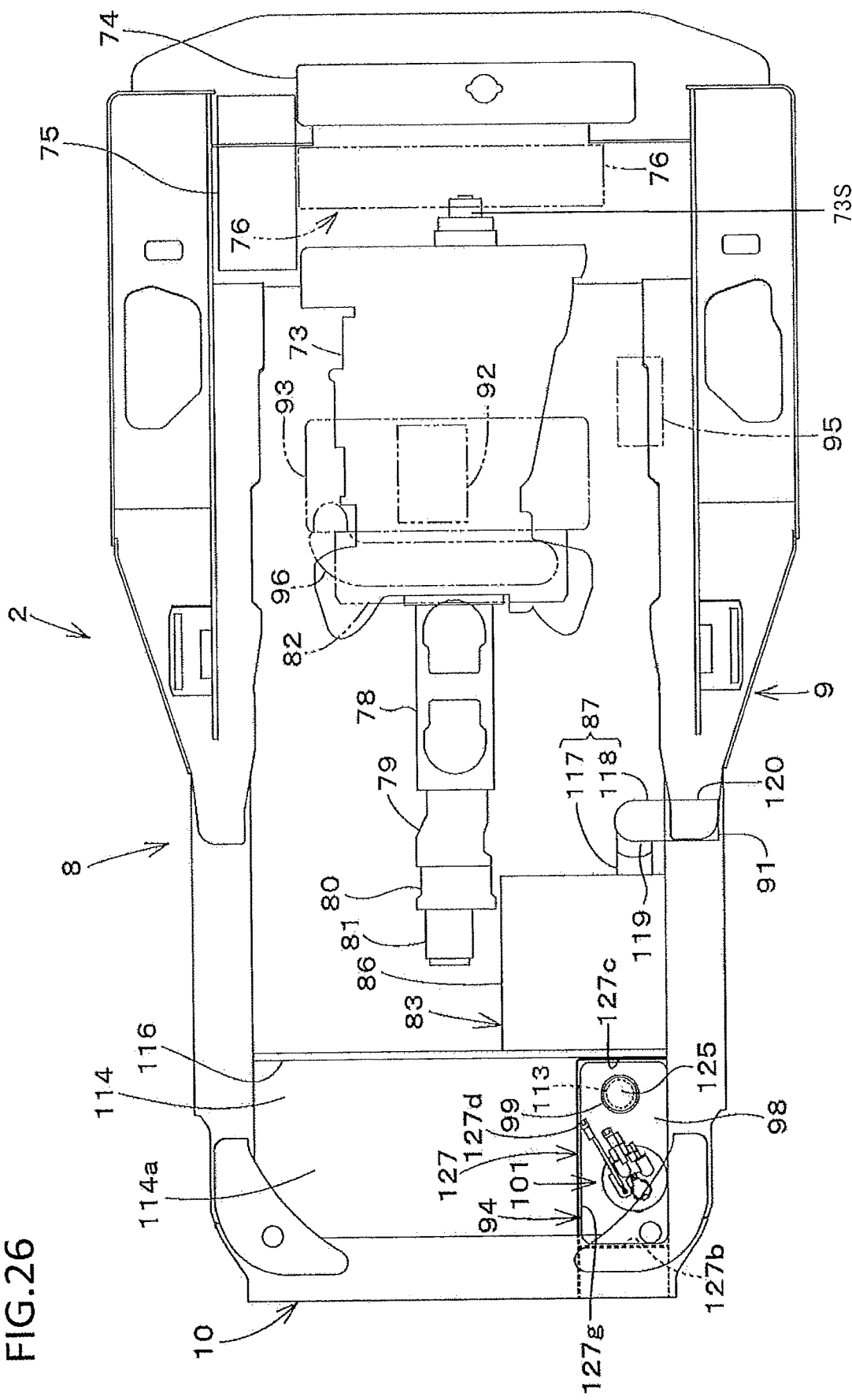
FIG. 26 is a schematic plan view of the interior of the machine body showing the fifth embodiment.

FIGS. 25 and 26 show a fifth embodiment. Elements having substantially the same function as those in the second to fourth embodiments will be numbered the same here, and will not be described and/or illustrated again in detail here for the sake of brevity.

In the fifth embodiment, a clearance is provided between a side end (left end) of a step 114 and a side frame portion 9 (left side frame portion 9). On the side where this clearance is provided which is the side (left side) of the step 114, a urea aqueous solution tank 94 (second tank main body 98) is provided. Therefore, the urea aqueous solution tank 94 (second tank main body 98) is provided in a machine body 2 and in a cabin 3. In a front part of the machine body 2, a support member 127 supporting the urea aqueous solution tank 94 is provided ranging from a front frame portion 10 to a vertical plate 116. The support member 127 is attached to the machine body 2. In detail, this support member 127 has a lower wall 127a, a front vertical wall 127b, a rear vertical wall 127c, a side vertical wall 127d, and an extension wall 127e. The lower wall 127a is spaced from a bottom frame portion 11 of the machine body 2 on the upper side. The front vertical wall 127b extends upward from a front end of the lower wall 127a. The rear vertical wall 127c extends upward from a rear end of the lower wall 127a. The side vertical wall 127d extends forward from a machine body inner side end part of the rear vertical wall 127c. A front end part of this side vertical wall 127d extends up to the front frame portion 10. The extension wall 127e extends forward from an upper end of the front vertical wall 127b. A front end part of this extension wall 127e extends up to the front frame portion 10. Upper ends of the front vertical wall 127b, the rear vertical wall 127c, and the side vertical wall 127d are positioned at a height position of a tread surface 114a of the step 114. A part surrounded by the lower wall 127a, the front vertical wall 127b, the rear vertical wall 127c, the side vertical wall 127d, and the left side frame portion 9 serves as a housing portion 127g housing the urea aqueous solution tank 94. The urea aqueous solution tank 94 is disposed on the lower wall 127a of the support member 127 and attached to the support member 127.

A second feeding pipe 99 does not have the second extension pipe 122 described in the second embodiment. Therefore, this second feeding pipe 99 is formed by a single pipe member.

The second feeding pipe 99 is provided in a rear part and on an upper surface of the second tank main body 98. A second feeding port 113 is opened upward. A cap 125 openably closing the second feeding port 113 is provided in an upper end of the second feeding pipe 99. In a case of this fifth embodiment, by opening a front panel 135, a urea aqueous solution can be fed to the urea aqueous solution tank 94 from an interior of the cabin 3. Fuel is fed to a fuel tank 83 from the left side of the machine body 2 which is the outer side of the machine body 2. Thereby, a confusion of feeding of the urea aqueous solution with feeding of the fuel can be prevented. In addition, the urea aqueous solution tank 94 is provided near the front panel 135. Thus, when the front panel 135 is opened, the urea aqueous solution can be fed immediately. The other configurations are the same as those of the second embodiment.

Sixth Embodiment

Figure 27:
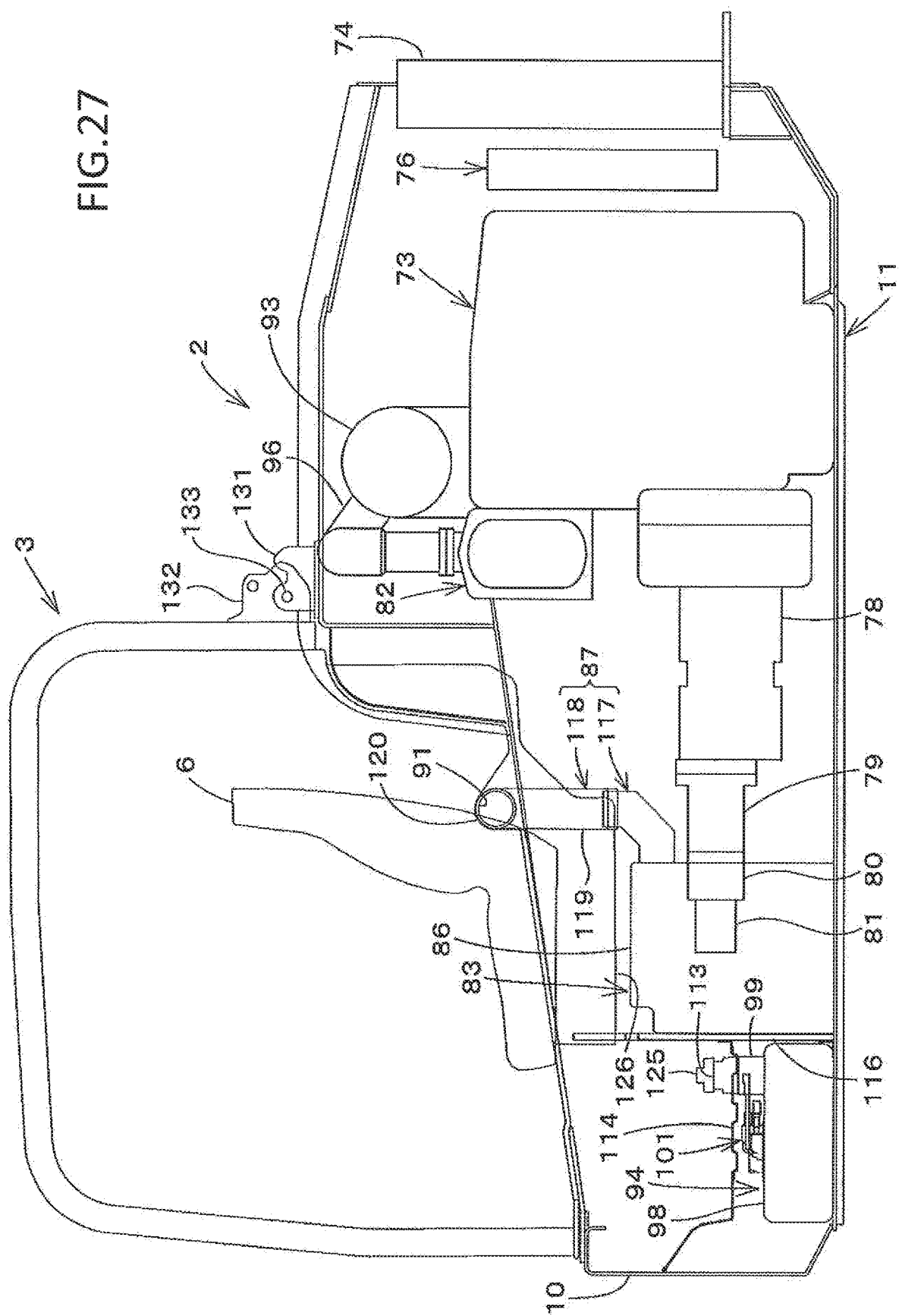
FIG. 27 is a schematic side view of an interior of a machine body showing a sixth embodiment.
Figure 28:
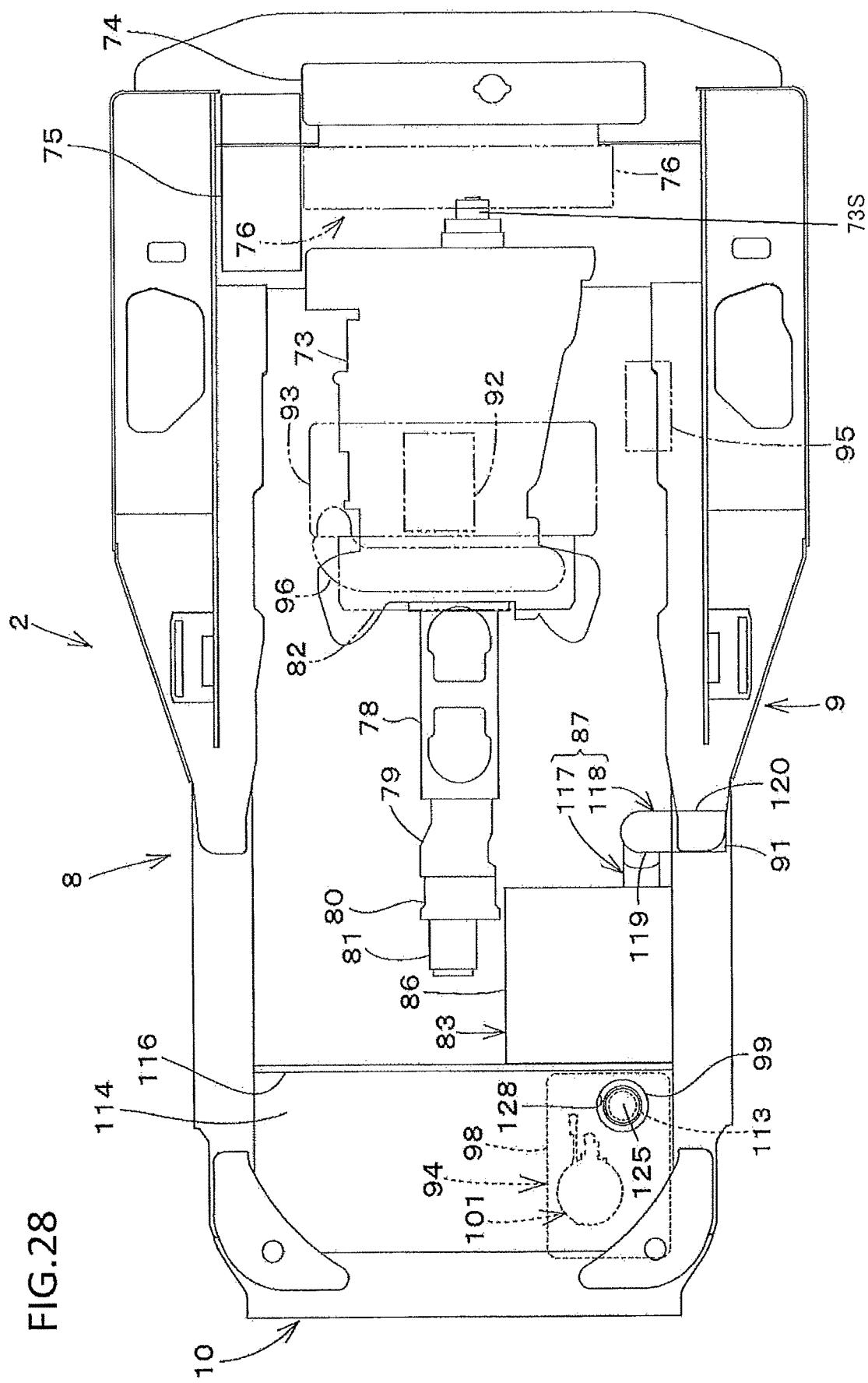
FIG. 28 is a schematic plan view of the interior of the machine body showing the sixth embodiment.

FIGS. 27 and 28 show a sixth embodiment. Elements having substantially the same function as those in the second to fifth embodiments will be numbered the same here, and will not be described and/or illustrated again in detail here for the sake of brevity.

In the sixth embodiment, a second tank main body 98 is provided in a machine body 2 on the lower side of a left part of a step 114. A second feeding pipe 99 does not have the second extension pipe 122 described in the second embodiment. Therefore, this second feeding pipe 99 is formed by a single pipe member.

The second feeding pipe 99 is provided in a rear part and on an upper surface of the second tank main body 98. A second feeding port 113 is opened upward. A cap 125 openably closing the second feeding port 113 is provided in an upper end of the second feeding pipe 99. A through hole 128 is formed in the left part of the step 114 which is the part corresponding to the second feeding pipe 99. Via this through hole 128, an upper part of the second feeding pipe 99 projects toward the upper side of the step 114. Therefore, the second feeding port 113 and the cap 125 are positioned in a cabin 3. Also in a case of this sixth embodiment, by opening a front panel 135, a urea aqueous solution can be fed to a urea aqueous solution tank 94 from an interior of the cabin 3. Fuel is fed to a fuel tank 83 from the left side of the machine body 2 which is the outer side of the machine body 2. Thereby, a confusion of feeding of the urea aqueous solution with feeding of the fuel can be prevented. In addition, the urea aqueous solution tank 94 is provided near the front panel 135. Thus, when the front panel 135 is opened, the urea aqueous solution can be fed immediately. The other configurations are the same as those of the second embodiment.

In the sixth embodiment, the second tank main body 98 is provided in the machine body 2 on the front side of the engine 73. Alternatively, the second tank main body 98 is provided in the machine body 2 on the front side of the engine 73 and on the rear side of the fuel tank 83. Alternatively, the second tank main body 98 is provided in the machine body 2 on the front side of the fuel tank 83. Thereby, the second tank main body 98 that stores a urea aqueous solution is installed in the place where the temperature environment is favorable. Accordingly, freezing, evaporation, and the like of the urea aqueous solution can be suppressed, and the urea aqueous solution tank 94 can be favorably mounted in the working machine 1 such as a compact track loader and a skid steering loader.

In the fifth embodiment and the sixth embodiment, the urea aqueous solution tank 94 is arranged in the machine body 2 on the front side of the vertical plate 116, and no heat sources are provided on the front side of the vertical plate 116. Thus, the urea aqueous solution tank 94 is not easily influenced by the heat sources in the machine body 2 such as the engine 73 and the hydraulic pumps 78, 79, 80, 81.

The first to sixth embodiments of the present invention are described above. The embodiments disclosed herein are thought to be not restriction but examples in all aspects. The scope of the present invention is indicated not by the above description but by the claims, and is intended to include equivalent meanings to the claims and all modifications within the scope.

Figure 30:
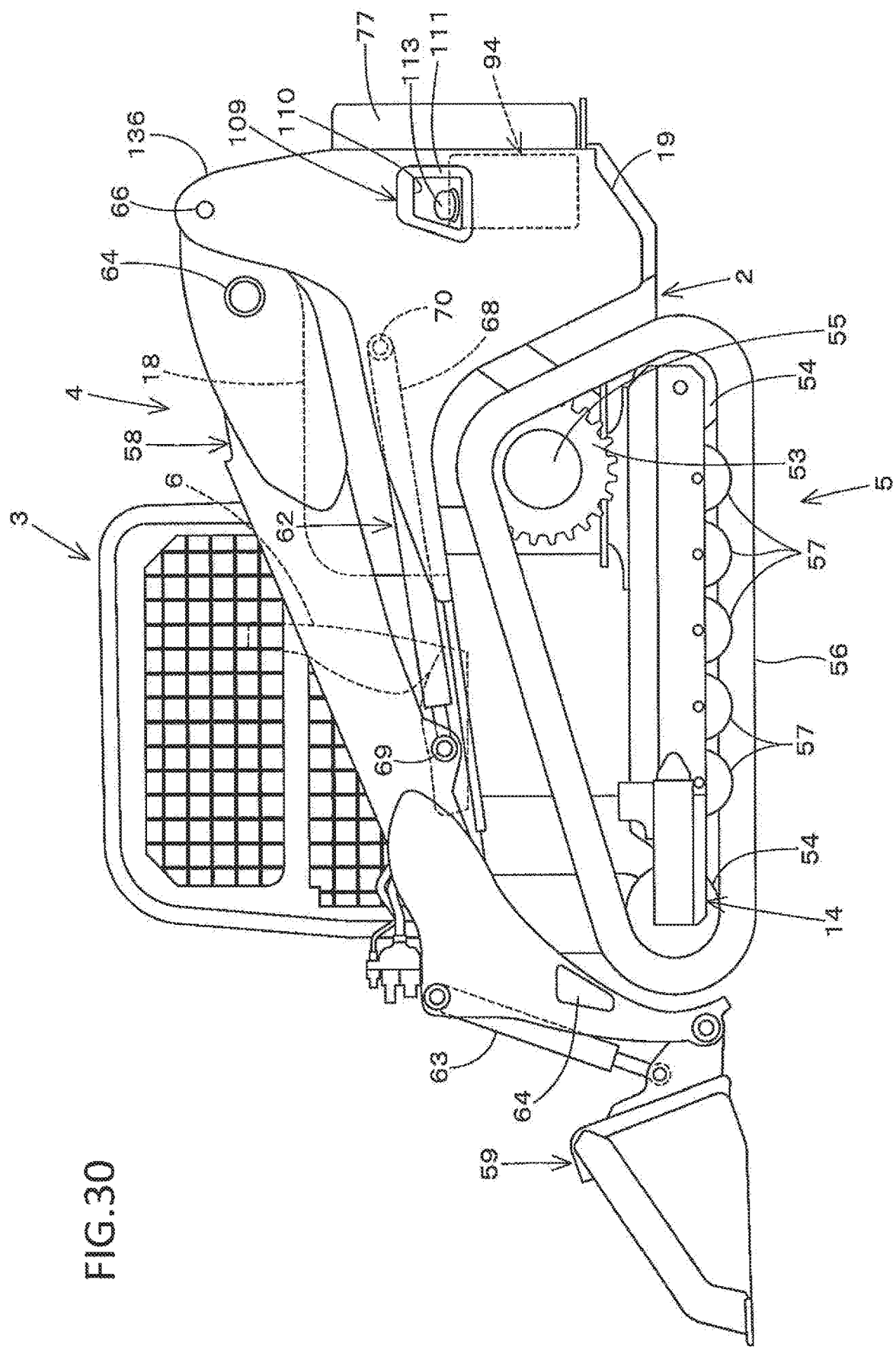
FIG. 30 is a side view showing a working machine having no lift links according to another variation of the first to sixth embodiments.
Figure 31:
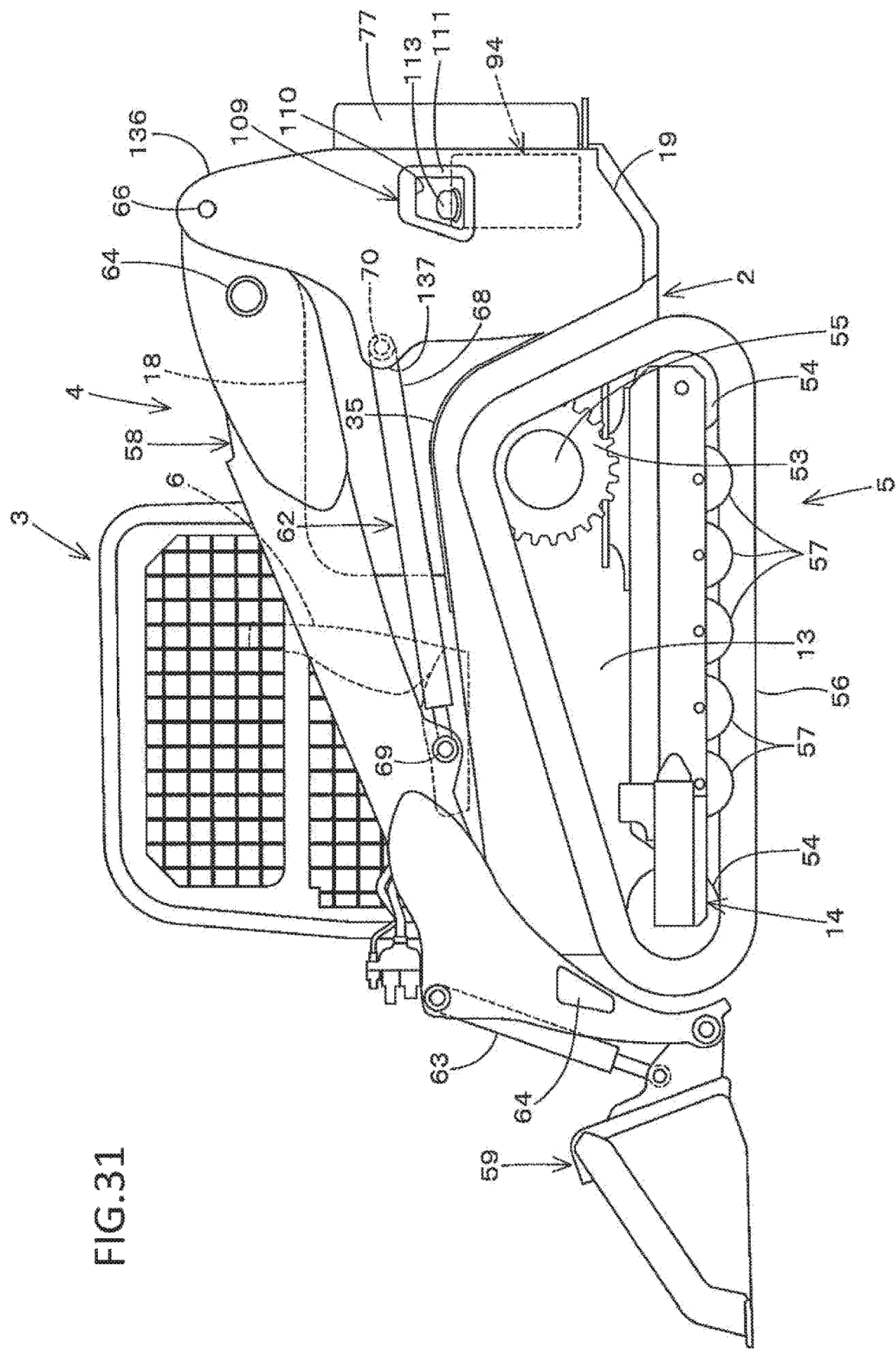
FIG. 31 is a side view showing another working machine having no lift links according to still another variation of the first to sixth embodiments.

For example, as shown in FIGS. 30 and 31, the embodiments of the present invention may be adopted as a working machine 1 having neither lift links 60 nor control links 61. A working machine 1 shown in FIG. 30 has boom support portions 136 extending upward in rear parts of an inner wall 18 and an outer wall 19. A rear part of a boom 58 is arranged between the boom support portions 136. The rear part of the boom 58 is supported on the boom support portions 136 rotatably about the lateral axis by a first pivot shaft 66. A boom cylinder 62 is arranged sidewise in such a manner that one end faces the front side and the other end faces the rear side. A cylinder tube 68 of the boom cylinder 62 is provided between the inner wall 18 and the outer wall 19. Therefore, the inner wall 18 is provided on the side of the boom cylinder 62 which is the machine body inner side. The outer wall 19 is provided on the side of the boom cylinder 62 which is the machine body outer side (on the side opposite to the inner wall 18). The one end of the boom cylinder 62 is supported on an intermediate part of the boom 58 pivotably rotatably about the lateral axis by a third pivot shaft 69. The other end of the boom cylinder 62 is supported between the inner wall 18 and the outer wall 19 pivotably rotatably about the lateral axis by a fourth pivot axis 70.

The other configurations are the same as the above embodiments.

A point of a working machine 1 shown in FIG. 31 different from the working machine 1 shown in FIG. 30 is as follows.

A pivotably supporting portion 137 is provided in an upper part on the front edge side of an outer wall 19. Between this pivotably supporting portion 137 and an inner wall 18, the other end of a boom cylinder 62 is supported pivotably rotatably about the lateral axis by a fourth pivot shaft 70.

Figure 32:
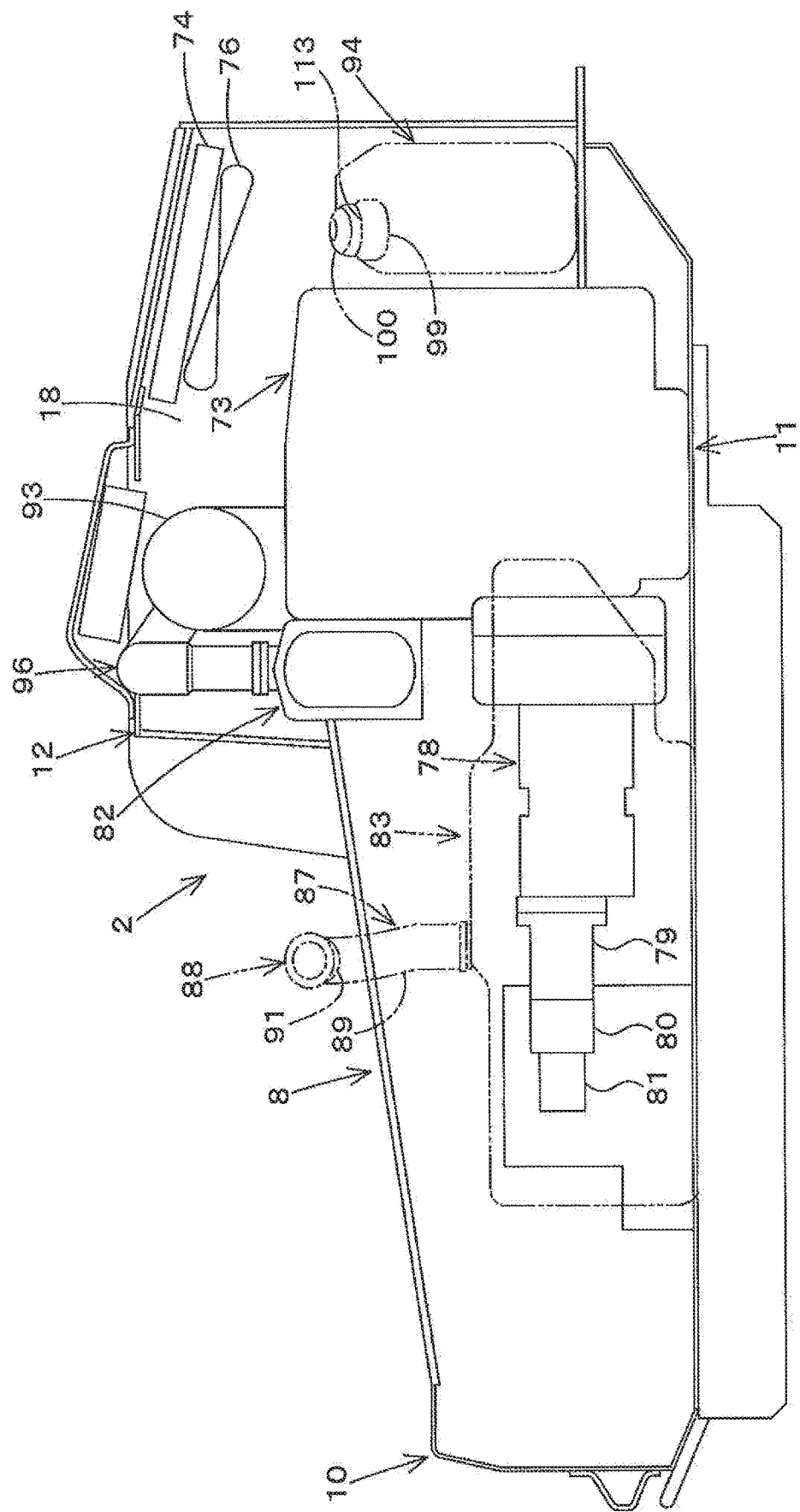
FIG. 32 is a schematic sectional side view of a working machine according to further variation of the first to sixth embodiments.

FIG. 32 shows a working machine 1 according to further variation of the embodiments. In this working machine 1, a radiator 74 is provided on the upper side of an engine 73. Between the radiator 74 and the engine 73, a cooling fan 76 driven by an electric motor, a hydraulic motor, or the like is provided. This cooling fan 76 also generates cooling wind toward the radiator 74. The cooling wind passing through the radiator 74 is discharged for example to the upper side of a machine body 2.

As shown in FIG. 33, in the further variation of the embodiments, no cut-away portion 26 is provided in an inner wall 18, and a machine body inner part of a urea aqueous solution tank 94 is covered by the inner wall 18. However, a hole for letting a hose connecting a supply portion 101 of the urea aqueous solution tank 94 and a SCR pump 95 pass through is provided. In this variation, a place surrounded by the inner wall 18, an outer wall 19, a rear wall 22, and a partition wall 22 serves as an installment portion 97. In other words, in this variation, a place surrounding four sides of the urea aqueous solution tank 94 including the front side, the rear side, the machine inner side, and the machine outer side serves as the installment portion 97.

It should be noted that as shown in FIG. 32, also in the working machine 1 according to the further variation in which the radiator 74 is provided on the upper side of the engine 73, an installment portion 97 may also be formed by an outer wall 19, a rear wall 21, and a partition wall 22 as shown in FIG. 4. In other words, a place surrounding three sides of a urea aqueous solution tank 94 including the front side, the rear side, and the machine body outer side may serve as the installment portion 97.

Obviously, numerous modifications and variations of the present invention are possible in light of the above teachings. It is therefore to be understood that within the scope of the appended claims, the invention may be practiced otherwise than as specifically described herein.

What is claimed is:

1. A working machine comprising:
   a machine body having a front and a rear opposite to the front in a front-rear direction of the working machine and having a right side and a left side opposite to the right side in a right-left direction perpendicular to the front-rear direction;
   a right traveling device arranged on the right side of the machine body;
   a left traveling device arranged on the left side of the machine body;
   a boom having a boom front and a boom rear opposite to the boom front in the front-rear direction, the boom rear being rotatably supported at the rear of the machine body, the boom front being to be connected to a working tool;
   an engine mounted in the machine body;
   a selective catalytic reduction catalyst provided in the machine body and connected to the engine;
   a fuel tank provided in the machine body to supply fuel to the engine;
   a urea aqueous solution tank to store a urea aqueous solution, the urea aqueous solution tank being connected to the selective catalytic reduction catalyst and provided in the machine body between the engine and the front of the machine body in the front-rear direction; and
   a traveling device support body supporting the right traveling device and the left traveling device, wherein the machine body does not rotate with respect to the traveling device support body.

2. The working machine according to claim 1, wherein the urea aqueous solution tank is provided between the front of the machine body and the fuel tank in the front-rear direction.

3. The working machine according to claim 1, further comprising:
   a first feeding port via which the fuel is supplied to the fuel tank; and
   a second feeding port via which the urea aqueous solution is supplied to the urea aqueous solution tank, the second feeding port being provided between the front of the machine body and the first feeding port in the front-rear direction.

4. The working machine according to claim 3, wherein the second feeding port is provided on either side of the right side and the left side in the right-left direction.

5. The working machine according to claim 4, wherein the second feeding port is provided between the boom and one of the right traveling device and the left traveling device in a height direction of the working machine, the height direction being perpendicular to the front-rear direction and to the right-left direction.

6. The working machine according to claim 1, wherein the engine has an output shaft which extends in the front-rear direction.

7. The working machine according to claim 6, further comprising:
   a radiator; and
   a cooling fan provided between the radiator and the engine to be rotated by the output shaft of the engine to cool the radiator.

8. The working machine according to claim 7,
   wherein the radiator is provided at the rear of the machine body, and
   wherein the cooling fan is provided between the radiator and the engine in the front-rear direction.

9. The working machine according to claim 7,
   wherein the radiator is provided above the engine in a height direction perpendicular to the front-rear direction and to the right-left direction, and
   wherein the cooling fan is provided between the radiator and the engine in the height direction.

10. The working machine according to claim 7, wherein the cooling fan is configured to be driven by the output shaft of the engine.

11. The working machine according to claim 1, further comprising:
    a cabin mounted in the machine body between the right side and the left side in the right-left direction and between the engine and the front of the machine body in the front-rear direction, the urea aqueous solution tank overlapping with the cabin in a height direction perpendicular to the front-rear direction and to the right-left direction.

12. The working machine according to claim 11, wherein the cabin includes a driver's seat on which a driver is to sit on and a step on which a foot of the driver sitting on the driver's seat is to be put, and wherein the urea aqueous tank overlaps with the step.

13. The working machine according to claim 1, further comprising:
a hydraulic pump configured to be driven by the engine, the hydraulic pump being provided between the engine and the front of the machine body in the front-rear direction.

14. The working machine according to claim 13, wherein the engine has an output shaft, and wherein the hydraulic pump has a shaft to be driven by the output shaft of the engine and is provided such that the shaft of the hydraulic pump is substantially coaxial with the output shaft of the engine.

15. The working machine according to claim 14, wherein the engine is provided such that the output shaft of the engine is provided in the front-rear direction.

16. The work machine according to claim 15, wherein the urea aqueous solution tank is provided between the hydraulic pump and the front of the machine body in the front-rear direction.

17. The work machine according to claim 15, wherein the urea aqueous solution tank overlaps with the hydraulic pump.

18. The working machine according to claim 15, further comprising:
a hydraulic motor provided between a rear end of the engine and the front of the machine body in the front-rear direction to be driven by the hydraulic pump to drive at least one of the right traveling device or the left traveling device, the hydraulic motor having a rotational center axis, the urea aqueous solution tank being provided between the rotational center axis of the hydraulic motor and the front of the machine body in the front-rear direction.

19. The work machine according to claim 1, wherein the selective catalytic reduction catalyst is provided on the engine in a height direction perpendicular to the front-rear direction and to the right-left direction.

20. The work machine according to claim 19, further comprising:
a particulate filter connected to the engine and configured to remove particles containing in an exhaust gas from the engine, the particulate filter being provided between the selective catalytic reduction catalyst and the urea aqueous solution tank in the front-rear direction.

21. The working machine according to claim 1, further comprising:
a first feeding port via which the fuel is supplied to the fuel tank, the first feeding port being provided on either side of the right side and the left side in the right-left direction; and
a second feeding port via which the urea aqueous solution is supplied to the urea aqueous solution tank, the second feeding port is provided on the either side of the right side and the left side in the right-left direction.

22. The working machine according to claim 21, wherein the second feeding port is provided between the boom and one of the right traveling device and the left traveling device in a height direction of the working machine, the height direction being perpendicular to the front-rear direction and to the right-left direction.

23. The working machine according to claim 22, wherein the urea aqueous solution tank is provided on the either side of the right side and the left side in the right-left direction.

24. A working machine comprising:
a machine body having a front and a rear opposite to the front in a front-rear direction of the working machine and having a right side and a left side opposite to the right side in a right-left direction perpendicular to the front-rear direction;
a right traveling device arranged on the right side of the machine body;
a left traveling device arranged on the left side of the machine body;
a boom having a boom front and a boom rear opposite to the boom front in the front-rear direction, the boom rear being rotatably supported at the rear of the machine body, the boom front being to be connected to a working tool, the boom being provided at one of the right side and the left side of the machine body;
an additional boom having an additional boom front and an additional boom rear opposite to the additional boom front in the front-rear direction, the additional boom rear being rotatably supported at the rear of the machine body, the additional boom front being to be connected to the working tool, the additional boom being provided at another of the right side and the left side of the machine body;
an engine mounted in the machine body;
a selective catalytic reduction catalyst provided in the machine body and connected to the engine;
a fuel tank provided in the machine body to supply fuel to the engine; and
a urea aqueous solution tank to store a urea aqueous solution, the urea aqueous solution tank being connected to the selective catalytic reduction catalyst and provided in the machine body between the engine and the front of the machine body in the front-rear direction and between the boom and the additional boom in the right-left direction.

25. The working machine according to claim 24, wherein the urea aqueous solution tank is provided between the front of the machine body and the fuel tank in the front-rear direction.

26. The working machine according to claim 24, further comprising:
a first feeding port via which the fuel is supplied to the fuel tank; and
a second feeding port via which the urea aqueous solution is supplied to the urea aqueous solution tank, the second feeding port being provided between the front of the machine body and the first feeding port in the front-rear direction.

27. The working machine according to claim 26, wherein the second feeding port is provided on either side of the right side and the left side in the right-left direction.

28. The working machine according to claim 27, wherein the second feeding port is provided between one of the boom and the additional boom and one of the right traveling device and the left traveling device in a height direction of the working machine, the height direction being perpendicular to the front-rear direction and to the right-left direction.

29. The working machine according to claim 24, wherein the engine has an output shaft which extends in the front-rear direction.

30. The working machine according to claim 29, further comprising:
a radiator; and
a cooling fan provided between the radiator and the engine to be rotated by the output shaft of the engine to cool the radiator.

31. The working machine according to claim 30,
wherein the radiator is provided at the rear of the machine body, and
wherein the cooling fan is provided between the radiator and the engine in the front-rear direction.

32. The working machine according to claim 30,
wherein the radiator is provided above the engine in a height direction perpendicular to the front-rear direction and to the right-left direction, and
wherein the cooling fan is provided between the radiator and the engine in the height direction.

33. The working machine according to claim 30, wherein the cooling fan is configured to be driven by the output shaft of the engine.

34. The working machine according to claim 24, further comprising:
a cabin mounted in the machine body between the right side and the left side in the right-left direction and between the engine and the front of the machine body in the front-rear direction, the urea aqueous solution tank overlapping with the cabin in a height direction perpendicular to the front-rear direction and to the right-left direction.

35. The working machine according to claim 34,
wherein the cabin includes a driver's seat on which a driver is to sit on and a step on which a foot of the driver sitting on the driver's seat is to be put, and
wherein the urea aqueous tank overlaps with the step.

36. The working machine according to claim 24, further comprising:
a hydraulic pump configured to be driven by the engine, the hydraulic pump being provided between the engine and the front of the machine body in the front-rear direction.

37. The working machine according to claim 36,
wherein the engine has an output shaft, and
wherein the hydraulic pump, has a shaft to be driven by the output shaft of the engine and is provided such that the shaft of the hydraulic pump is substantially coaxial with the output shaft of the engine.

38. The working machine according to claim 37, wherein the engine is provided such that the output shaft of the engine is provided in the front-rear direction.

39. The work machine according to claim 38, wherein the urea aqueous solution tank is provided between the hydraulic pump and the front of the machine body in the front-rear direction.

40. The work machine according to claim 38, wherein the urea aqueous solution tank overlaps with the hydraulic pump.

41. The working machine according to claim 38, further comprising:
a hydraulic motor provided between a rear end of the engine and the front of the machine body in the front-rear direction to be driven by the hydraulic pump to drive at least one of the right traveling device or the left traveling device, the hydraulic motor having a rotational center axis, the urea aqueous solution tank being provided between the rotational center axis of the hydraulic motor and the front of the machine body in the front-rear direction.

42. The work machine according to claim 24, wherein the selective catalytic reduction catalyst is provided on the engine in a height direction perpendicular to the front-rear direction and to the right-left direction.

43. The work machine according to claim 42, further comprising:
a particulate filter connected to the engine and configured to remove particles containing in an exhaust gas from the engine, the particulate filter being provided between the selective catalytic reduction catalyst and the urea aqueous solution tank in the front-rear direction.

44. The working machine according to claim 24, further comprising:
a first feeding port via which the fuel is supplied to the fuel tank, the first feeding port being provided on either side of the right side and the left side in the right-left direction; and
a second feeding port via which the urea aqueous solution is supplied to the urea aqueous solution tank, the second feeding port is provided on the either side of the right side and the left side in the right-left direction.

45. The working machine according to claim 44, wherein the second feeding port is provided between one of the boom and the additional boom and one of the right traveling device and the left traveling device in a height direction of the working machine, the height direction being perpendicular to the front-rear direction and to the right-left direction.

46. The working machine according to claim 45, wherein the urea aqueous solution tank is provided on the either side of the right side and the left side in the right-left direction.

* * * * *